US009762546B2

(12) United States Patent
Seo et al.

(10) Patent No.: US 9,762,546 B2
(45) Date of Patent: Sep. 12, 2017

(54) MULTI-CONNECTION SYSTEM AND METHOD FOR SERVICE USING INTERNET PROTOCOL

(71) Applicants: Jeong Hoan Seo, Seoul (KR); Young Suk Lim, Seoul (KR)

(72) Inventors: Jeong Hoan Seo, Seoul (KR); Young Suk Lim, Seoul (KR)

(73) Assignees: Jeong Hoan Seo (KR); Young Suk Lim (KR)

( * ) Notice: Subject to any disclaimer, the term of this patent is extended or adjusted under 35 U.S.C. 154(b) by 0 days.

(21) Appl. No.: 14/392,329

(22) PCT Filed: Jun. 27, 2014

(86) PCT No.: PCT/KR2014/005771
§ 371 (c)(1),
(2) Date: Dec. 23, 2015

(87) PCT Pub. No.: WO2014/209075
PCT Pub. Date: Dec. 31, 2014

(65) Prior Publication Data
US 2016/0173452 A1    Jun. 16, 2016

(30) Foreign Application Priority Data

Jun. 27, 2013  (KR) .................. 10-2013-0074919
Jun. 27, 2014  (KR) .................. 10-2014-0080166

(51) Int. Cl.
*G06F 11/00*      (2006.01)
*H04L 29/06*      (2006.01)
(Continued)

(52) U.S. Cl.
CPC ...... *H04L 63/0281* (2013.01); *H04L 12/6418* (2013.01); *H04L 45/36* (2013.01);
(Continued)

(58) Field of Classification Search
CPC . H04L 63/0281; H04L 12/6418; H04L 29/06; H04L 45/36; H04L 61/1511;
(Continued)

(56) References Cited

U.S. PATENT DOCUMENTS 5,311,593 A  *  5/1994  Carmi ................ H04L 63/0428
                                                                       370/400
6,182,139 B1 *  1/2001  Brendel ................ H04L 29/06
                                                                       709/201
(Continued)

FOREIGN PATENT DOCUMENTS

JP     2003-110604 A    4/2003
JP     2009-147579 A    7/2009
(Continued)

OTHER PUBLICATIONS

Notice of Allowance for the Korean Patent Application No. 10-2014-0080166 dated Feb. 26, 2016.
(Continued)

*Primary Examiner* — Sharon Lynch
(74) *Attorney, Agent, or Firm* — Fitch Even Tabin & Flannery LLP

(57) ABSTRACT

Disclosed are a multi-connection system (MCS) and method for a service using an Internet protocol. The MCS includes a plurality of proxies; an MCS client to receive a packet to be transmitted from the client to the server, generate MCS packets by adding an MCS sequence identification (ID) to the packet, and sequentially and respectively transmit the MCS packets to the plurality of proxies, wherein a number of MCS packets corresponds to a number of pieces of proxy access information connected to the plurality of proxies or a set number of pieces of proxy access information; and an MCS server to respectively receive the MCS packets from the plurality of proxies; extract the MCS sequence IDs from the MCS packets, compare the extracted MCS sequence IDs
(Continued)

with MCS sequence IDs stored beforehand; store the extracted MCS sequence IDs, generate server-receivable packets from the MCS packets, and transmit the server-receivable packets to the server when the extracted MCS sequence IDs are not identical to the stored MCS sequence IDs; and block the MCS packets from being transmitted to the server when the extracted MCS sequence IDs are identical to the stored MCS sequence IDs.

12 Claims, 20 Drawing Sheets

(51) Int. Cl.
  H04L 12/64 (2006.01)
  H04L 12/721 (2013.01)
  H04L 29/12 (2006.01)
  H04L 29/08 (2006.01)
(52) U.S. Cl.
  CPC ...... H04L 61/1511 (2013.01); H04L 61/2007 (2013.01); H04L 63/1458 (2013.01); H04L 67/28 (2013.01); H04L 67/42 (2013.01); H04L 69/14 (2013.01)
(58) Field of Classification Search
  CPC ..... H04L 61/2007; H04L 67/28; H04L 67/42; H04L 69/14
  See application file for complete search history.

(56) References Cited

U.S. PATENT DOCUMENTS

| | | | |
|---|---|---|---|
| 7,016,973 B1 | 3/2006 | Sibal et al. | |
| 7,058,974 B1* | 6/2006 | Maher, III | H04L 47/22 370/229 |
| 7,203,963 B1* | 4/2007 | Wu | G06F 21/552 709/224 |
| 7,305,546 B1* | 12/2007 | Miller | H04L 63/029 713/153 |
| 7,316,029 B1* | 1/2008 | Parker | H04L 63/0272 370/428 |
| 7,464,407 B2* | 12/2008 | Nakae | H04L 63/0227 713/182 |
| 7,725,708 B2* | 5/2010 | Wu | H04L 41/0893 370/352 |
| 7,843,906 B1* | 11/2010 | Chidambaram | H04L 47/6205 370/386 |
| 7,958,549 B2* | 6/2011 | Nakae | H04L 63/0227 726/11 |
| 8,225,085 B2* | 7/2012 | Karandikar | H04L 63/166 709/231 |
| 8,732,296 B1* | 5/2014 | Thomas | H04L 63/0227 370/230 |
| 8,844,019 B2* | 9/2014 | Barkai | H04L 63/0281 726/12 |
| 9,183,382 B2* | 11/2015 | Kim | H04L 63/1458 |
| 9,407,602 B2* | 8/2016 | Feghali | H04L 63/0209 |
| 2003/0223367 A1* | 12/2003 | Shay | H04L 43/106 370/231 |
| 2004/0172557 A1* | 9/2004 | Nakae | H04L 63/0227 726/22 |
| 2004/0181694 A1* | 9/2004 | Cox | H04L 63/1458 713/154 |
| 2004/0243703 A1 | 12/2004 | Demmer et al. | |
| 2005/0050353 A1* | 3/2005 | Thiele | G06F 21/554 726/4 |
| 2006/0077964 A1* | 4/2006 | Wu | H04L 41/0893 370/352 |
| 2006/0126522 A1* | 6/2006 | Oh | H04L 63/1416 370/250 |
| 2006/0174324 A1* | 8/2006 | Zur | H04L 63/1416 726/3 |
| 2007/0097976 A1* | 5/2007 | Wood | H04L 63/1416 370/392 |
| 2007/0115988 A1* | 5/2007 | Miller | H04L 63/0236 370/392 |
| 2007/0156919 A1* | 7/2007 | Potti | G06F 8/67 709/238 |
| 2007/0209070 A1* | 9/2007 | Yadav | H04L 63/1408 726/14 |
| 2008/0046989 A1* | 2/2008 | Wahl | G06F 21/55 726/7 |
| 2008/0060074 A1* | 3/2008 | Okuyama | H04L 63/1441 726/23 |
| 2008/0062879 A1 | 3/2008 | Sivakumar et al. | |
| 2008/0168559 A1* | 7/2008 | Touitou | H04L 63/0236 726/23 |
| 2008/0172739 A1* | 7/2008 | Nakae | H04L 63/0227 726/22 |
| 2008/0282339 A1* | 11/2008 | Nakae | H04L 63/0227 726/13 |
| 2009/0249470 A1* | 10/2009 | Litvin | H04L 63/0263 726/13 |
| 2010/0122317 A1* | 5/2010 | Yadav | H04L 63/1408 726/1 |
| 2010/0281178 A1* | 11/2010 | Sullivan | H04N 7/24 709/231 |
| 2011/0138456 A1* | 6/2011 | Ormazabal | H04L 12/2697 726/11 |
| 2011/0141937 A1* | 6/2011 | Breslin | H04L 67/327 370/252 |
| 2012/0072605 A1 | 3/2012 | Xu et al. | |
| 2012/0106377 A1* | 5/2012 | Sommers | H04L 43/0829 370/252 |
| 2013/0195108 A1* | 8/2013 | Hu | G06F 9/546 370/392 |
| 2013/0242743 A1* | 9/2013 | Thomas | H04L 63/0227 370/236 |
| 2013/0263268 A1* | 10/2013 | Kim | H04L 63/1458 726/23 |
| 2013/0329732 A1* | 12/2013 | Vyas | H04L 45/745 370/392 |
| 2014/0105031 A1* | 4/2014 | McDysan | H04L 45/302 370/242 |
| 2014/0105039 A1* | 4/2014 | McDysan | H04L 41/5051 370/252 |
| 2014/0105062 A1* | 4/2014 | McDysan | H04L 45/306 370/254 |
| 2014/0105216 A1* | 4/2014 | McDysan | H04L 67/1095 370/400 |
| 2014/0143850 A1* | 5/2014 | Barkai | H04L 63/0281 726/12 |
| 2015/0120915 A1* | 4/2015 | Erb | H04L 63/20 709/224 |
| 2015/0128246 A1* | 5/2015 | Feghali | H04L 63/0209 726/13 |

FOREIGN PATENT DOCUMENTS

| | | |
|---|---|---|
| JP | 2011-9927 A | 1/2011 |
| KR | 10-2008-0051576 A | 6/2008 |
| KR | 10-2009-0083339 A | 8/2009 |
| KR | 10-2010-0014199 A | 2/2010 |
| KR | 2011-0093677 A | 8/2011 |
| KR | 10-2012-0072908 A | 7/2012 |
| WO | 2008/091899 A1 | 7/2008 |

OTHER PUBLICATIONS

International Search Report dated Oct. 6, 2014 for PCT/KR2014/005771 and English translation of the same. (4 pages).
Written Opinion of the International Searching Authority dated Oct. 6, 2014 for PCT/KR2014/005771 and English translation of the same. (11 pages).
European Search Report dated Feb. 7, 2017 for European Patent Application No. 14817169.7. (5 pages).

(56) References Cited

OTHER PUBLICATIONS

Japanese Office Action dated Oct. 28, 2017 for Japanese Patent Application No. 2016-523655. (2 pages).

* cited by examiner

MULTI-CONNECTION SYSTEM AND METHOD FOR SERVICE USING INTERNET PROTOCOL

CROSS-REFERENCE TO RELATED APPLICATIONS

This application is a U.S. National Phase Patent Application of International Patent Application Number PCT/KR2014/005771, filed on Jun. 27, 2014, which claims priority of Korean Patent Application Number 10-2013-0074919, filed Jun. 27, 2013 and Korean Patent Application Number 10-2014-0080166, filed Jun. 27, 2014, which are hereby incorporated herein by reference in their entirety.

FIELD OF THE INVENTION

The present invention is related to an Internet service system, and more particularly, to a multi-connection system and method for providing a service using an Internet protocol for permanent use of an Internet service.

BACKGROUND OF THE INVENTION

A distributed denial of service (DDoS) attack means an attack of making a specific web site unavailable or blocking services from being provided on the specific web site by controlling several tens to several hundreds of computers at a remote place to simultaneously access the specific web site so that the specific web site may be overloaded within a short time. In general, in order to block the DDoS attack, a network infrastructure for dispersing or absorbing a large amount of traffic is prepared, the amount of traffic to flow into a system, which is a target of attack, is controlled using IPS (Intrusion Protection System) equipment, well-known harmful packets are blocked, and harmful traffic is blocked by installing exclusive equipment at a front end of the system.

However, control personnel are indispensable to diverting and handling traffic in the middle of the above methods. Thus, the DDoS attack is difficult to block in real time and it is unavoidable that a service is discontinued at least once at first.

A client may establish one-to-one communication with a first server or a second server to be provided a desired service.

However, in such a service system, information regarding a server (e.g., an IP address) may be exposed when a client establishes one-to-one communication with the server. Thus, the service system may become a target of attack. To prevent this problem, a gateway or a proxy server may be installed to not expose information regarding the server (e.g., an IP address). However, in this case, the problems of the server may be a burden on the gateway or the proxy.

SUMMARY OF THE INVENTION

The present invention provides a multi-connection system (MCS) which is configured to provide a service using an Internet protocol, and is capable of blocking attackers and continuously providing services even when a proxy cannot be used due to an abnormal cause, e.g., a malicious user's attack or a physical cause.

The present invention also provides a multi-connection method of providing a service using an Internet protocol.

The present invention also provides an MCS client for use in an MCS for a service using an Internet protocol.

The present invention also provides an MCS server for use in an MCS for a service using an Internet protocol.

According to an aspect of the present invention, a multi-connection system (MCS) configured to connect a client and a server in a multi-connection manner for a service using an Internet protocol, the MCS includes a plurality of proxies; an MCS client configured to receive a packet to be transmitted from the client to the server, generate MCS packets by adding an MCS sequence identification (ID) identifying the packet to the packet, and sequentially and respectively transmit the MCS packets to the plurality of proxies connected via a network, wherein a number of MCS packets corresponds to a number of pieces of proxy access information connected to the plurality of proxies or a set number of pieces of proxy access information; and an MCS server configured to respectively receive the MCS packets from the plurality of proxies; extract the MCS sequence IDs from the MCS packets, compare the extracted MCS sequence IDs with MCS sequence IDs stored beforehand; store the extracted MCS sequence IDs, generate server-receivable packets from the MCS packets, and transmit the server-receivable packets to the server when the extracted MCS sequence IDs are not identical to the stored MCS sequence IDs; and block the MCS packets from being transmitted to the server when the extracted MCS sequence IDs are identical to the stored MCS sequence IDs.

The MCS client may transmit a query requesting proxy access information to the server or a domain name server (DNS) which uses or provides pieces of preset proxy access information, receives the proxy access information from the DNS, and uses the proxy access information as the pieces of set proxies access information.

The MCS client may store access information by forming sessions with the plurality of proxies, and transmits the MCS packets, to which the MCS sequence IDs are added, to the plurality of proxies.

The MCS client may set packet transmission priorities to be assigned to the plurality of proxies, and transmits the MCS packets to the plurality of proxies according to the set packet transmission priorities, wherein the packet transmission priorities are set based on times when the MCS client transmits a device-checking packet to the plurality of proxies and receives responses from the plurality of proxies.

The MCS server may set priorities to be assigned to the plurality of proxies, based on an order in which the MCS packets are received when the MCS packets are respectively received from the plurality of proxies.

According to another aspect of the present invention, a multi-connection system (MCS) configured to connect a client and a server in a multi-connection manner for a service using an Internet protocol, the system includes a plurality of proxies; an MCS server configured to receive a packet from the server, generate MCS packets by adding an MCS sequence identification (ID) identifying the packet to the packet, and sequentially and respectively transmit the MCS packets to the plurality of proxies connected via a network, wherein a number of MCS packets corresponds to a number of pieces of proxy access information connected to the plurality of proxies or a set number of pieces of proxy access information; an MCS client configured to respectively receive the MCS packets from the plurality of proxies; extract the MCS sequence IDs from the MCS packets; compare the extracted MCS sequence IDs with MCS sequence IDs stored beforehand; store the extracted MCS sequence IDs, generate client-receivable packets from the MCS packets, and transmit the client-receivable packets to the client when the extracted MCS sequence IDs are not identical to the stored MCS sequence IDs, and block the MCS packets received from the plurality of proxies from being transmitted to the client when the extracted MCS sequence IDs are identical to the stored MCS sequence IDs.

The MCS server may transmit the MCS packets, to which the MCS sequence IDs are added, to the plurality of proxies connected via the network, based on preset transmission priorities assigned to the plurality of proxies, wherein the MCS server sets the preset transmission priorities based on an order in which packets are respectively received from the plurality of proxies.

The MCS server may store access information by forming sessions with the plurality of proxies, and transmits the MCS packets, to which the MCS sequence IDs are added, to the plurality of proxies.

According to another aspect of the present invention, a multi-connection system (MCS) client includes a forward packet receiving unit configured to receive a forward packet to be transmitted from a client to a server; an MCS packet generation unit configured to generate a forward MCS packet by adding a forward MCS sequence identification (ID) identifying the forward packet to the forward packet; a forward packet transmission unit configured to sequentially and respectively transmit the forward MCS packet to the plurality of proxies; a backward packet receiving unit configured to respectively receive backward MCS packets from the plurality of proxies; a packet determination unit configured to extract backward MCS sequence IDs from the MCS backward packets, check whether the extracted MCS sequence IDs are identical to MCS sequence IDs stored beforehand, block the backward MCS packets received from the plurality of proxies from being transmitted to the client when the extracted MCS sequence IDs are identical to the stored MCS sequence IDs, and store the extracted MCS sequence IDs when the extracted MCS sequence IDs are not identical to the stored MCS sequence IDs; a packet generation unit configured to generate server-receivable packets from the backward MCS packets received from the plurality of proxies when the extracted MCS sequence IDs are not identical to MCS sequence IDs; and a backward packet transmission unit configured to transmit the server-receivable packets to the client.

In one embodiment, the MCS client may further includes a connection controller configured to transmit a query requesting proxy access information to the server or a domain name server (DNS) which uses or provides pieces of preset proxy access information, receives proxy access information from the DNS, and uses the proxy access information as pieces of set proxy access information.

The MCS client may further includes a failure detection unit configured to detect a failure occurring in the plurality of proxies; and a failure restoration unit configured to search for a list of available proxy servers when a failure is detected, select an available proxy server from the list other than the plurality of proxies, and replace a proxy in which the failure occurs with the selected proxy server.

The MCS client may further includes a failure detection unit configured to detect a failure occurring in the plurality of proxies; and a failure restoration unit configured to transmit a query requesting proxy access information to the server or a domain name server (DNS) which provides proxy access information when a failure is detected, receive the proxy access information from the DNS, and replace a proxy in which the failure occurs with a proxy corresponding to the proxy access information.

According to another aspect of the present invention, a multi-connection system (MCS) server includes a backward packet receiving unit configured to receive a backward packet to be transmitted from a server to a client; an MCS packet generation unit configured to generate backward MCS packets in a number of proxies connected to the MCS by adding a backward MCS sequence identification (ID) identifying the backward packet to the backward packet; a backward packet transmission unit configured to sequentially and respectively transmit the backward MCS packets to the plurality of proxies; a forward packet receiving unit configured to respectively receive forward MCS packets from the plurality of proxies; a packet determination unit configured to extract forward MCS sequence IDs from the forward MCS packets, check whether the extracted forward MCS sequence IDs are identical to forward MCS sequence ID stored beforehand, block the forward MCS packets received from the plurality of proxies from being transmitted to the server when the extracted forward MCS sequence IDs are identical to the stored forward MCS sequence IDs, and store the extracted forward MCS sequence IDs when the extracted forward MCS sequence IDs are not identical to the stored forward MCS sequence IDs; a packet generation unit configured to generate server-receivable packets from the forward MCS packets from the plurality of proxies when the extracted forward MCS sequence IDs are not identical to the stored forward MCS sequence IDs; a forward packet transmission unit configured to transmit the server-receivable packets to the server.

In one embodiment, the MCS client may further includes a proxy priority setting unit configured to set transmission priorities to be assigned to the plurality of proxies based on an order in which packets are respectively received from the plurality of proxies when the packets are respectively received from the plurality of proxies, and wherein the backward packet transmission unit transmits the backward MCS packets, to which the backward MCS sequence IDs are added, to the plurality of proxies connected via a network, according to the transmission priorities.

According to another aspect of the present invention, a multi-connection method for a service using an Internet protocol, the method includes generating multi-connection system (MCS) packets by adding an MCS sequence identification (ID) identifying the packet to a packet when the packet is received from a client, the generating of the MCS packet being performed by an MCS client; sequentially and respectively transmitting the MCS packets to a plurality of proxies connected via a network, the sequentially transmitting of the MCS packet being performed by the MCS client; transmitting the MCS packets received from the MCS client to an MCS server connected to the plurality of proxies via the network, the transmitting of the MCS packets being performed by the plurality of proxies; checking MCS sequence IDs included in the MCS packets when the MCS packets are respectively received from the plurality of proxies, the checking of the MCS sequence IDs being performed by the MCS server; storing the MCS sequence IDs when the MCS sequence IDs are not identical to MCS sequence IDs stored in the MCS server, generating server-receivable packets from the MCS packets, and transmitting the server-receivable packets to the server, wherein the storing the MCS sequence IDs, the generating of the server-receivable packets, and the transmitting of the server-receivable packets are performed by the MCS server: and blocking the MCS packets received from the plurality of proxies from being transmitted to the server when the MCS sequence IDs are identical to the stored MCS sequence IDs, the blocking of the MCS packets being performed by the MCS server.

The MCS client may store access information by forming sessions with the plurality of proxies, and transmits the MCS packets to the plurality of proxies.

The MCS client may set packet transmission priorities to be assigned to the plurality of proxies and transmits packets to the plurality of proxies according to the packet transmission priorities, wherein the MCS client transmits a device-checking packet to the plurality of proxies and sets the packet transmission priorities based on times when responses are received from the plurality of proxies.

The MCS server may set priorities to be assigned to the plurality of proxies based on an order in which packets are received from the plurality of proxies when the packets are respectively received from the plurality of proxies.

According to another aspect of the present invention, a multi-connection method for a service using an Internet protocol, the method includes generating multi-connection system (MCS) packets by adding an MCS sequence identification (ID) to a packet when the packet is received from a server, the generating of the MCS packet being performed by an MCS server, wherein the MCS sequence ID identifies the packet; sequentially and respectively transmitting the MCS packets to a plurality of proxies connected via a network, the sequentially transmitting of the MCS packet being performed by the MCS server; checking the MCS sequence IDs included in the MCS packets when the MCS packets are respectively received from the plurality of proxies, the checking of the MCS sequence IDs being performed by the MCS client; storing the MCS sequence IDs when the MCS sequence IDs are not identical to MCS sequence IDs stored in the MCS client, generating client-receivable packets from the MCS packets, and transmitting the client-receivable packets to the client, wherein the storing the MCS sequence IDs, the generating of the client-receivable packets, and the transmitting of the client-receivable packets are performed by the MCS client: and blocking the MCS packets received from the plurality of proxies from being transmitted to the client when the MCS sequence IDs are identical to the stored MCS sequence IDs, the blocking of the MCS packets being performed by the MCS client.

The MCS server may transmit the MCS packets, to which the MCS sequence IDs are added, to the plurality of proxies connected via the network according to preset transmission priorities assigned to the plurality of proxies, wherein the MCS server sets the transmission priorities based on an order in which packets are respectively received from the plurality of proxies.

The MCS server may store access information by forming sessions with the plurality of proxies, and transmits the MCS packets to the plurality of proxies.

According to another aspect of the invention, there is provided a non-transitory processor-readable recording medium having recorded thereon a program for performing the above methods by using a processing apparatus.

A multi-connection system (MCS) and method for permanent use of an Internet service, according to the present invention, have the following advantages and effects.

Currently, network systems having a single connection structure have been generally used. The single connection structure means a structure in which a client and a server are connected in a one-to-one fashion. In addition, a structure in which a client, a proxy, and a server are directly connected to one another and thus the proxy acts as an intermediary is available but is not significantly different from the single connection structure.

Due to the single connection structure, a client and a server cannot communicate with each other when a failure occurs in a line between the client and the server. Also, the single connection structure has a problem that communication is down the moment that a corresponding equipment that is in problem is replaced with spare equipment to restore the failure line. Thus, it is very difficult to continuously provide a service with the single connection structure.

However, an MCS according to the present invention has an improvement on the single connection structure. In the MCS, an MCS client and an MCS server are prepared for a client and a server so that a packet may be transmitted to at least one proxy using these servers. This means that an MSC structure is configured to provide at least one line between the client and the server.

In an MCS according to the present invention, a client and a server use an MCS client and an MCS server to obtain the same effect as when a plurality of lines are used. Thus, even if a failure occurs in a specific line between the client and the server, another line is available and thus a service may be seamlessly provided. Also, in the MCS according to the present invention, communication is established via a plurality of lines at the same time. Thus communication may be established using another line when a specific device has a failure and is replaced with another device, thereby seamlessly establishing communication.

Accordingly, an MCS according to the present invention is an effective system capable of guaranteeing permanent use of a service, which is a very important factor in a network market that has been continuously developed and increased in size.

DETAILED DESCRIPTION OF THE PREFERRED EMBODIMENTS

Figure 1:
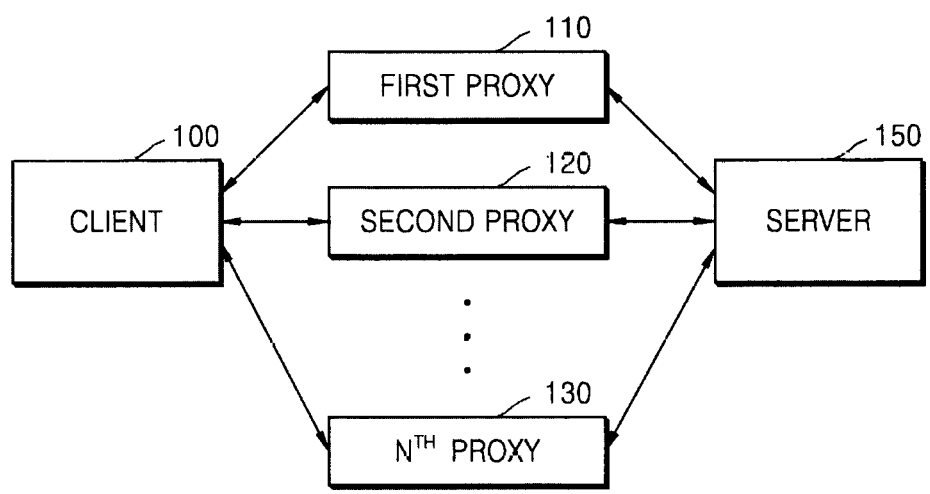
FIG. 1 is a diagram illustrating a connection relationship among a plurality of proxy servers, a client, and a server.

Hereinafter, exemplary embodiments of the present invention will be described in detail with reference to the accompanying drawings. The exemplary embodiments set forth herein and in the drawings are merely examples of the present invention and do not completely represent the technical idea of the present invention. Thus, it should be understood that there may be various equivalents and modified examples that exist at the filing date of the present application and that may replace for these exemplary embodiments.

In a multi-connection system (hereinafter referred to as 'MCS'), even if a failure occurs in a line between a client and a server, the server may continuously provide a service to the client and the client may continuously use the service provided from the server.

All devices capable of establishing network communication, such as a personal computer (PC), a smart phone, etc., transmit or receive data by transmitting or receiving packets. When a packet is transmitted or received, the devices are connected via a single line. Thus, when the single line is down, the devices cannot communicate with one another. The MCS is designed to solve this problem.

The MCS includes an MCS client and an MCS server. The same packet may be transmitted to or received from at least one proxy using the MCS client and the MCS server. Thus, even if a failure occurs in some lines connecting devices, at least one spare line is prepared and thus communication may be continuously established via the at least one spare line.

However, the MCS transmits the same packet to at least one line according to the system characteristics thereof. The packets received via the at least one line are processed using the features of the devices. However, the devices cannot simultaneously process jobs but sequentially process jobs.

In the MCS, packets are sequentially transmitted to lines and a device receiving the packets responds to a request from another device that transmits the packets, based on a packet that is first transmitted to the device among the packets.

FIG. 1 is a diagram illustrating a connection relationship among a plurality of proxy servers, a client, and a server. Proxies 110, 120, and 130 are located between a client 100 and a server 150 to form a plurality of data transmission paths between the client 100 and the server 150.

Figure 2:
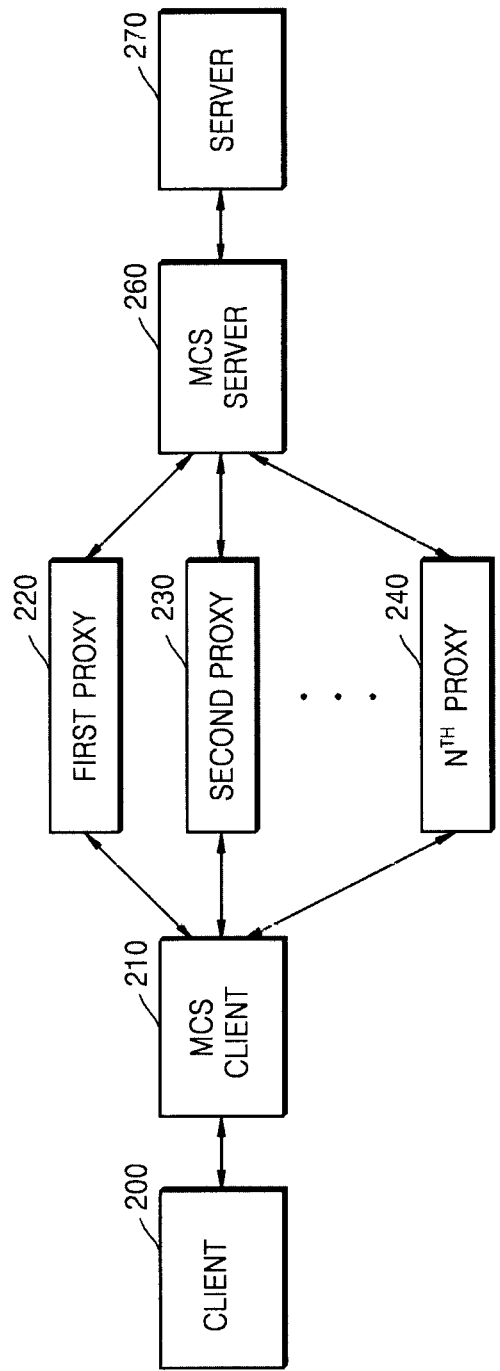
FIG. 2 is a diagram illustrating a connection relationship among a plurality of proxy servers, a client, and a server according to an embodiment of the present invention.

FIG. 2 is a block diagram of a system to which an MCS according to an embodiment of the present invention is applicable. An MCS client 210 is located between a client 200 and proxies 220, 230, and 240, and an MCS server 260 is located between the proxies 220, 230, and 240 and a server 270. The proxies 220, 230, and 240 may be configured in a single stage, as illustrated in FIG. 2, or in a multi-stage. That is, each of the proxy servers 220, 230, and 240 may be replaced with a set of several proxy servers connected in series.

The MCS according to an embodiment of the present invention includes the MCS client 210, the MCS server 260, and the proxies 220, 230, and 240.

The MCS client 210 transmits a packet to the MCS server 260 and receives a packet from the MCS server 260. A packet that the client 200 desires to transmit to the server 270 is received by the MCS client 210 and transmitted to the MCS server 260 via at least one of the proxies 220, 230, and 240. Then, the packets transmitted from the MCS server 260 and at least one among the proxies 220, 230, and 240 are checked by the MCS client 210 to determine the states of the packets and whether the packets are redundant, and are then transmitted to the client 200. The MCS client 210 may be located inside or outside the client 200. The MCS client 210 may be embodied in various forms, e.g., a program, equipment, a tool, etc.

The MCS server 260 transmits a packet to the MCS client 210 and receives a packet from the MCS client 210. A packet that the server 270 desires to transmit to the client 200 may be received by the MCS server 260 and transmitted to the MCS client 210 via at least one among the proxies 220, 230, and 240. Packets received from the MCS client 210 via the at least one among the proxies 220, 230, and 240 are checked by the MCS server 260 to determine the states of the packets and whether the packets are redundant, and are then transmitted to the server 270. The MCS server 260 may be located inside or outside the server 270 according to circumstances, and embodied in various forms, e.g., a program, equipment, a tool, etc.

The server 270 provides a service to the client 200. Here, the server 270 may be understood as various equipment according to circumstances or an ambient environment, and includes elements configured to provide a service to the client 200. The server 270 may include hardware, an operating system (OS), a network-based service providing program, etc.

The client 200 is an element configured to receive a service from the server 270 and use the service. Here, the client 200 may be understood to include various devices (such as a PC, a smart phone, a tablet PC, etc.) capable of transmitting a request for a service to the server 270 so as to use the service according to circumstances or an ambient environment. The client 200 may include hardware, an OS, a network-based service providing program, etc.

The features of a proxy may be largely divided into two parts. A first feature of the proxy is that the proxy temporarily stores data of a server in a caching manner. When a client accesses to the proxy, the client receives the data of the server stored in the proxy. A second feature of the proxy is that when communication is established between a client and a server, the proxy is located between the client and the server to transmit a packet to a destination. An MCS according to an embodiment of the present invention employs the above second feature of the proxy.

Figure 3:
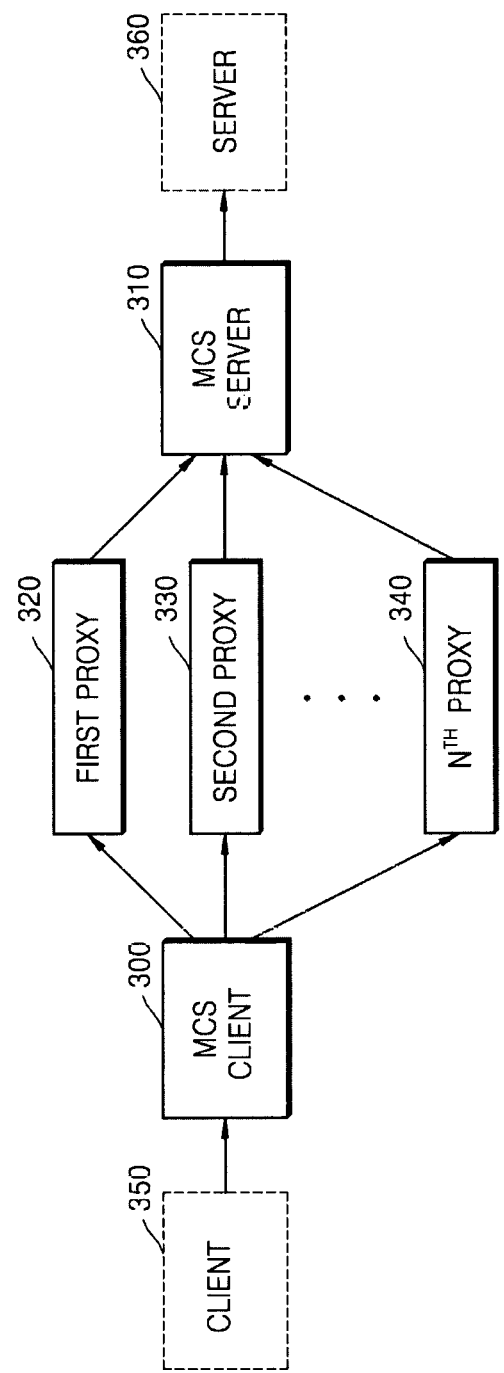
FIG. 3 is a block diagram of a multi-connection system (MCS) for a service using an Internet protocol, according to an embodiment of the present invention.

FIG. 3 is a block diagram of an MCS for a service using an Internet protocol, according to an embodiment of the present invention. The MCS includes proxies 320, 330, and 340, an MCS client 300, and an MCS server 310.

The MCS client 300 receives a packet that a client 350 desires to transmit to a server 360. The MCS client 300 adds an MCS sequence ID identifying the packet to the packet so as to generate MCS packets in a number corresponding to the number of pieces of proxy access information connected to(?) the proxies 320, 330, and 340. or a set number of pieces of set proxy access information. The MCS client 300 sequentially transmits the MCS packets to the proxies 320, 330, and 340 connected to each other via a network.

The MCS client 300 may use the set number of pieces of proxy access information, or may transmit a query requesting proxy access information to a server (not shown) or a domain name server (DNS) (not shown) that provides a plurality of pieces of proxy access information, receive the proxy access information from the DNS, and use the received proxy access information as the pieces of proxy access information.

The MCS client 300 may form sessions with the proxies 320, 330, and 340, respectively to store the proxy access information and transmit the MCS packets, to which the MCS sequence ID is added, to the proxies 320, 330, and 340.

The MCS client 300 may set packet transmission priorities to be assigned to the proxies 320, 330, and 340 and transmit packets to the proxies 320, 330, and 340 according to the packet transmission priorities. Here, the MCS client 300 may transmit a device-checking packet to the proxies 320, 330, and 340 and set the packet transmission priorities, based on times when responses to this packet are respectively received from the proxies 320, 330, and 340.

The MCS server 310 receives MCS packets from the proxies 320, 330, and 340, respectively. The MCS server 310 may extract MCS sequence IDs from the MCS packets, respectively, compare the extracted MCS sequence IDs with MCS sequence IDs stored beforehand, store the extracted MCS sequence IDs when the extracted MCS sequence IDs are not identical to the stored MCS sequence IDs, generate server-receivable packets from the MCS packets, and transmit the server-receivable packets to the server 360. When the extracted MCS sequence IDs are identical to the stored MCS sequence IDs, the MCS server 310 does not transmit the MCS packets to the server 360.

When the MCS server 310 receives MCS packets from the respective proxies 320, 330, and 340, the MCS server 310 may set priorities to be assigned to the proxies 320, 330, and 340 based on an order in which the MCS packets are received.

The proxies 320, 330, and 340 relay MCS packets between the MCS client 300 and the MCS server 310.

Figure 4:
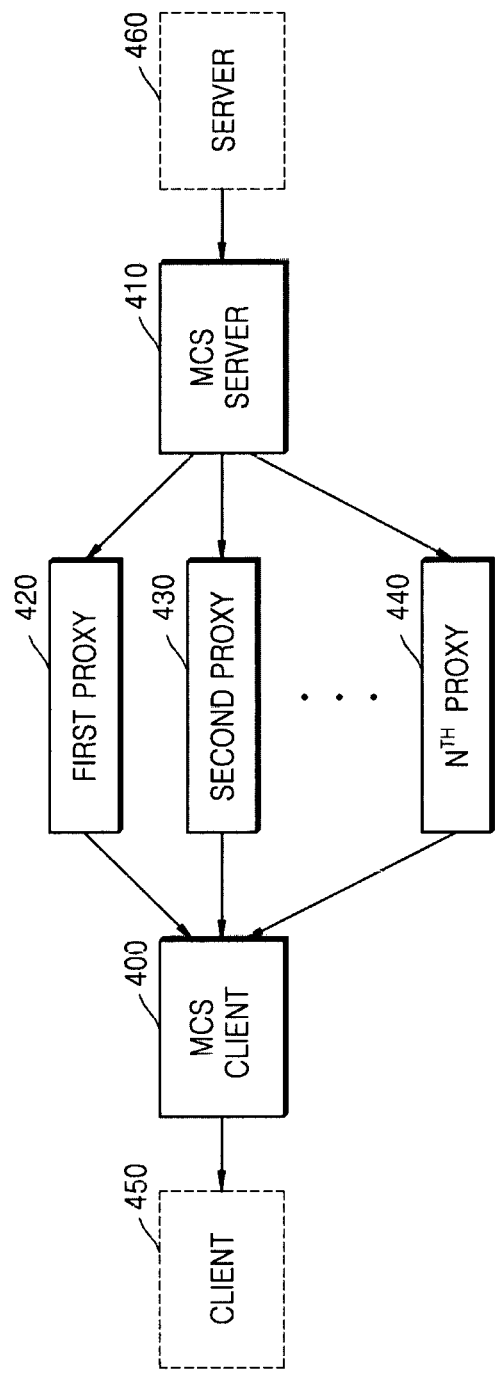
FIG. 4 is a block diagram of an MCS for a service using an Internet protocol, according to another embodiment of the present invention.

FIG. 4 is a block diagram of an MCS for a service using an Internet protocol, according to another embodiment of the present invention. The MCS includes a plurality of proxies 420, 430, and 440, an MCS client 400, and an MCS server 410.

The MCS server 410 receives a packet from a server 460, and adds an MCS sequence ID identifying the packet to the packet so as to generate MCS packets in a number corresponding to the number of pieces of proxy access information connected to the proxies 420, 430, and 440 or a set number of pieces of proxy access information. The MCS client 400 sequentially transmits the MCS packets to the proxies 420, 430, and 440 connected in a network.

The MCS client 400 receives MCS packets from the respective proxies 420, 430, and 440. The MCS client 400 extracts MCS sequence IDs from the MCS packets, compares the extracted MCS sequence IDs with MCS sequence IDs stored beforehand, stores the extracted MCS sequence IDs when the extracted MCS sequence IDs are not identical to the stored MCS sequence IDs, generates client-receivable packets from the MCS packets, and then transmits the client-receivable packets to a client 450. When the extracted MCS sequence IDs are identical to the stored MCS sequence IDs, the MCS client 400 does not transmit the MCS packets from the proxies 420, 430, and 440 to the client 450.

The MCS server 410 may transmit the MCS packets, to which the MCS sequence IDs are added, to the proxies 420, 430, and 440 connected via a network according to transmission priorities that are set beforehand to be assigned to the proxies 420, 430, and 440. Here, the MCS server 410 may set the transmission priorities assigned to the proxies 420, 430, and 440, based on an order in which the MCS packets are received from the respective proxies 420, 430, and 440.

The MCS server 410 may form sessions with the respective proxies 420, 430, and 440 so as to store access information and transmit the MCS packets, to which the MCS sequence IDs are added, to the proxies 420, 430, and 440.

The proxies 420, 430, and 440 relay the MCS packets between the MCS client 400 and the MCS server 410.

Figure 5:
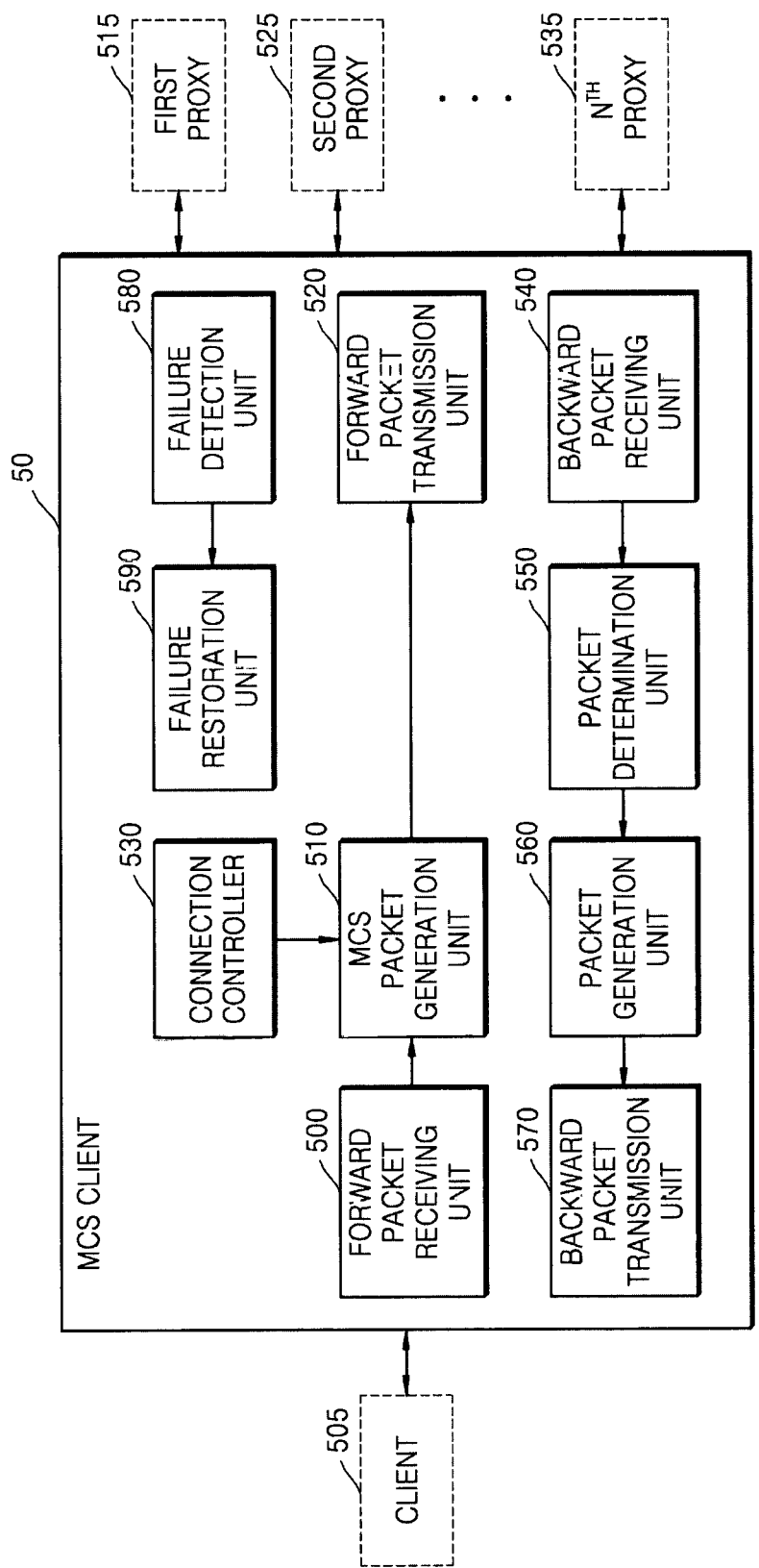
FIG. 5 is a block diagram of an MCS client 50 according to an embodiment of the present invention.

FIG. 5 is a block diagram of an MCS client 50 according to an embodiment of the present invention. The MCS client 50 may include a forward packet receiving unit 500, an MCS packet generation unit 510, a forward packet transmission unit 520, a backward packet receiving unit 540, a packet determination unit 550, a packet generation unit 560, and a backward packet transmission unit 570. The MCS client 50 may further include a connection control unit 530, a failure detection unit 580, and a failure restoration unit 590.

The forward packet receiving unit 500 receives a forward packet that a client 505 desires to transmit to a server (not shown).

The MCS packet generation unit 510 generates forward MCS packets by adding a forward MCS sequence ID identifying the forward packet to the forward packet.

The forward packet transmission unit 520 sequentially transmits the forward MCS packets to proxies 515, 525, and 535.

The backward packet receiving unit 540 receives backward MCS packets from the respective proxies 515, 525, and 535.

The packet determination unit 550 extracts backward MCS sequence IDs from the backward packets, and compares them with MCS sequence IDs stored beforehand to determine whether the extracted backward MCS sequence IDs are identical to the stored MCS sequence IDs. When the extracted backward MCS sequence IDs are identical to the stored MCS sequence IDs, the packet determination unit 550 does not transmit the backward MCS packets received from the respective proxies 515, 525, and 535 to the client 505. When the extracted backward MCS sequence IDs are not identical to the stored MCS sequence IDs, the packet determination unit 550 stores the extracted MCS sequence IDs.

When the extracted backward MCS sequence IDs are not identical to the stored MCS sequence IDs, the packet generation unit 560 generates client-receivable packets from the backward MCS packets received from the respective proxies 515, 525, and 535.

The backward packet transmission unit 570 transmits the client-receivable packets generated by the packet generation unit 560 to the client 505.

The connection control unit 530 may use a plurality of pieces of set proxy access information, or may transmit a query requesting proxy access information to a server (not shown) or a DNS (not shown) that provides a plurality of pieces of proxy access information, receive the proxy access information from the DNS, and use the received proxy access information as the pieces of proxy access information.

The failure detection unit 580 detects whether a failure occurs in the proxies 515, 525, and 535.

When a failure is detected by the failure detection unit 580, the failure restoration unit 590 detects a list of available proxies, selects an available proxy server from the list of available proxies other than the proxies 515, 525, and 535, and replaces a proxy server in which the failure occurs among the proxies 515, 525, and 535 with the selected proxy server.

Also, when a failure is detected by the failure detection unit 580, the failure restoration unit 590 may transmit a query requesting proxy access information to a server (not shown) or a DNS (not shown) that provides proxy access information, and replace the proxy server in which the failure occurs with a proxy corresponding to the proxy access information when the proxy access information is received from the DNS.

Figure 6:
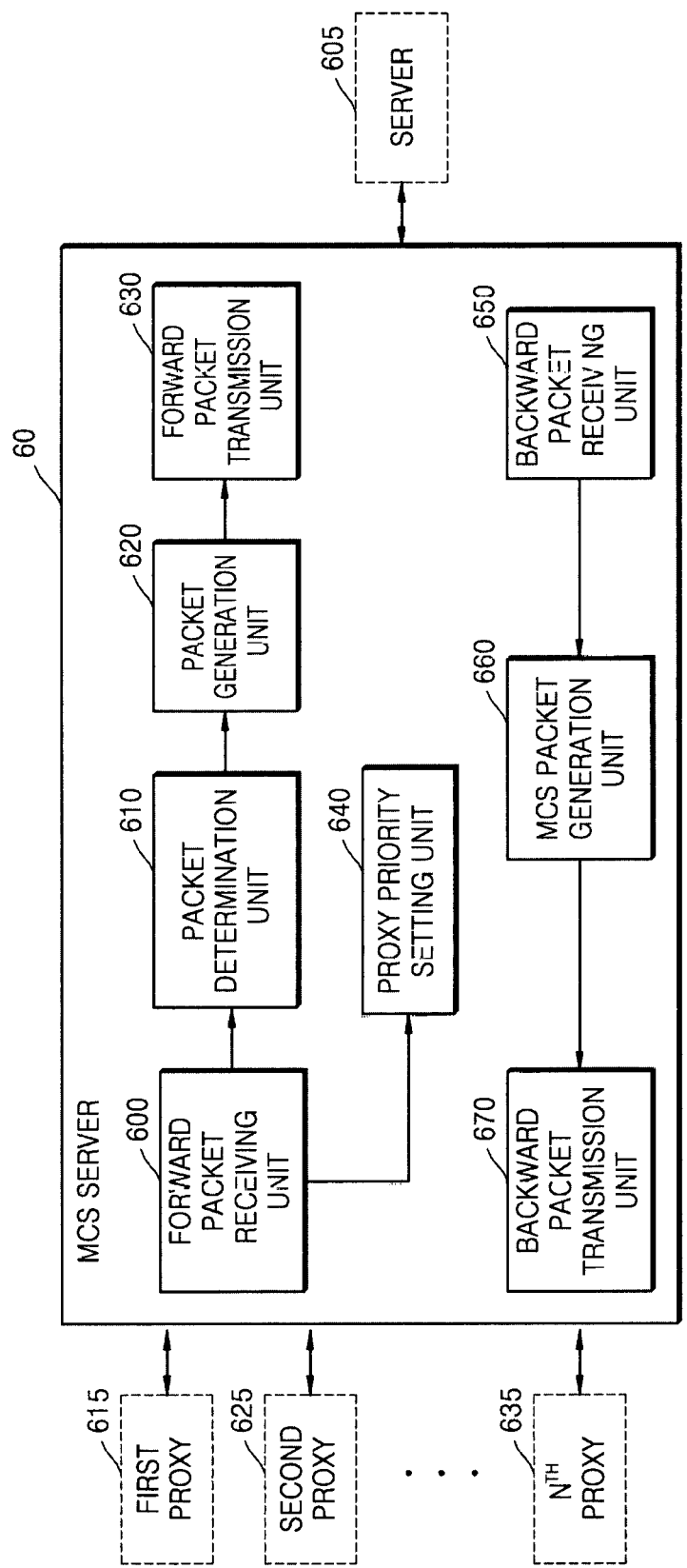
FIG. 6 is a block diagram of an MCS server 60 according to an embodiment of the present invention.

FIG. 6 is a block diagram of an MCS server 60 according to an embodiment of the present invention. The MCS server 60 includes a forward packet receiving unit 600, a packet determination unit 610, a packet generation unit 620, a forward packet transmission unit 630, a backward packet receiving unit 650, an MCS packet generation unit 660, and a backward packet transmission unit 670, and may further include a proxy priority setting unit 640.

The backward packet receiving unit 650 receives a backward packet from a server 605.

The MCS packet generation unit 660 adds a backward MCS sequence ID identifying the backward packet to the backward packet so as to generate backward MCS packets in a number corresponding to the number of proxies connected to the MCS server 60.

The backward packet transmission unit 670 sequentially transmits the backward MCS packet to proxies 615, 625, and 635.

The forward packet receiving unit 600 receives forward MCS packets from the respective proxies 615, 625, and 635.

The packet determination unit 610 extracts forward MCS sequence IDs from the forward MCS packets and checks whether the extracted forward MCS sequence IDs are identical to forward MCS sequence IDs stored beforehand. When the extracted forward MCS sequence IDs are identical to the stored forward MCS sequence IDs, the packet determination unit 610 discards the forward MCS packets received from the proxies 615, 625, and 635, respectively, without transmitting them to the server 605. When the extracted forward MCS sequence IDs are not identical to the stored forward MCS sequence IDs, the packet determination unit 610 stores the extracted MCS sequence IDs.

When the extracted forward MCS sequence IDs are not identical to the stored forward MCS sequence IDs, the packet generation unit 620 generates server-receivable packets from the forward MCS packets received from the respective proxies 615, 625, and 635.

The forward packet transmission unit 630 transmits the server-receivable packets generated by the packet generation unit 620 to the server 605.

When the proxy priority setting unit 640 receives packets from the proxies 615, 625, and 635, respectively, the proxy priority setting unit 640 sets transmission priorities to be assigned to the proxies 615, 625, and 635, based on an order in which the packets are received.

In this case, the backward packet transmission unit 670 may transmit the backward MCS packets, to which the backward MCS sequence IDs are added, to the proxies 615, 625, and 635 connected via a network, according to the transmission priorities.

Figure 9:
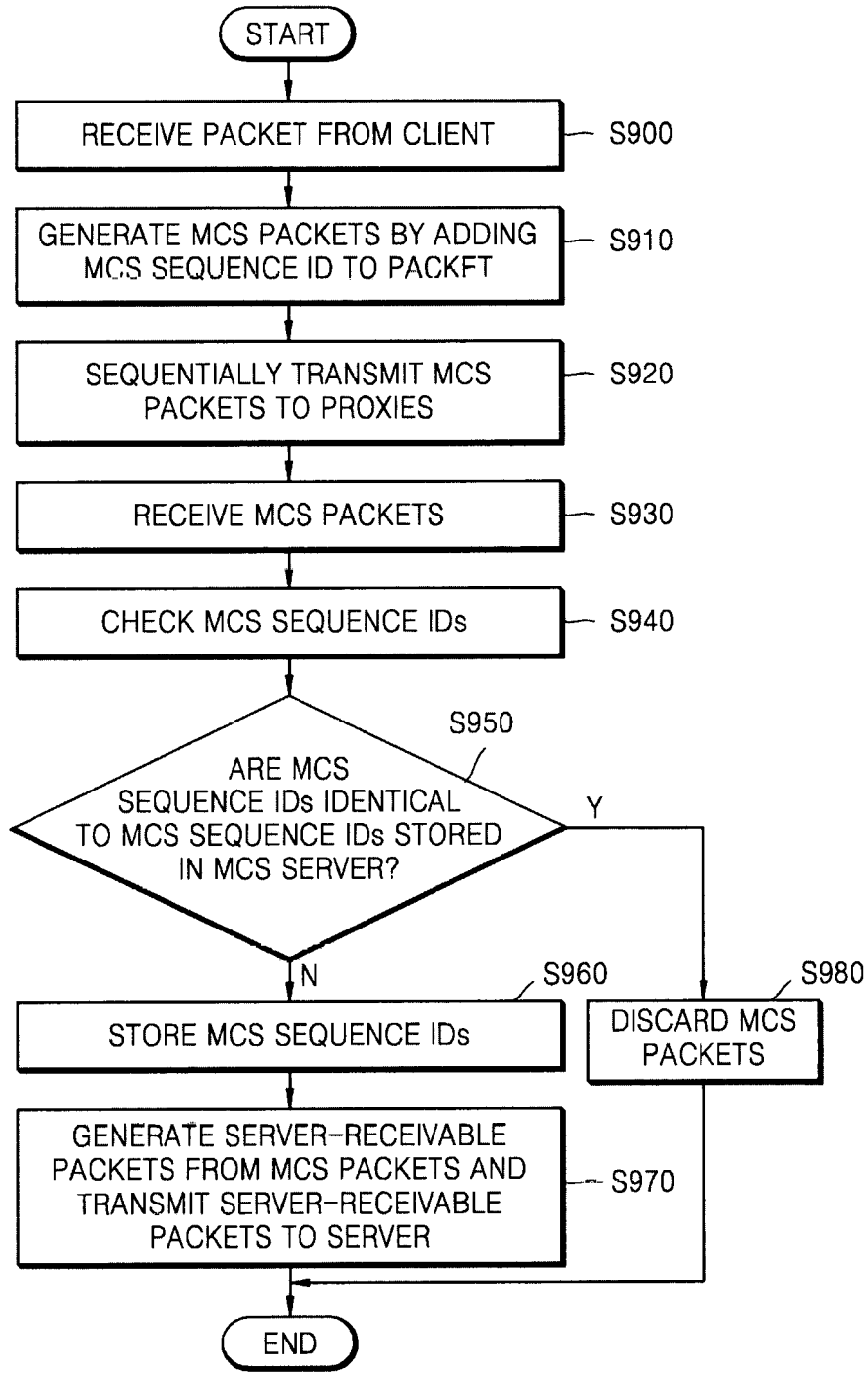
FIG. 9 is a flowchart of a multi-connection method of providing a service using an Internet protocol, according to an embodiment of the present invention.

FIG. 9 is a flowchart of a multi-connection method of providing a service using an Internet protocol, according to an embodiment of the present invention.

A multi-connection method of providing a service using an Internet protocol, according to an embodiment of the present invention, will be described with reference to FIGS. 3 and 9 below.

The MCS client 300 receives a packet from the client 350 (operation S900).

The MCS client 300 generates MCS packets by adding MCS sequence IDs identifying the packet to the packet (operation S910).

The MCS client 300 sequentially transmits the MCS packets to the proxies 320, 330, and 340 connected via a network (operation S920)

When the proxies 320, 330, and 340 respectively transmit the MCS packets received from the MCS client 300 to the MCS server 310 connected thereto via a network, the MCS server 310 respectively receives the MCS packets from the proxies 320, 330, and 340 (operation S930).

The MCS server 310 checks the MCS sequence IDs added to the MCS packets (operation S940)

The MCS server 310 compares the MCS sequence IDs with MCS sequence IDs stored in the MCS server 310 to determine whether they are the same (operation S950).

When the MCS sequence IDs are not identical to the stored MCS sequence IDs, the MCS server 310 stores the MCS sequence IDs (operation S960), and generates server-receivable packets from the MCS packets and transmits the server-receivable packets to the server 360 (operation S970).

When the MCS sequences ID are identical to the stored MCS sequence IDs, the MCS server 310 discards the MCS packets received from the proxies 320, 330, and 340 without transmitting the MCS packets to the server 360 (operation S980).

The MCS client 300 may form sessions with the respective proxies 320, 330, and 340 to store access information and transmit the MCS packets to the proxies 320, 330, and 340, respectively. Also, the MCS client 300 may set packet transmission priorities to be assigned to the proxies 320, 330, and 340 and transmit packets to the proxies 320, 330, and 340 according to the packet transmission priorities. Here, the MCS client 300 may transmit a device-checking packet to the proxies 320, 330, and 340 and set the packet transmission priorities, based on times when responses to this packet are respectively received from the proxies 320, 330, and 340.

When the MCS server 310 receives packets from the respective proxies 320, 330, and 340, the MCS server 310 sets the packet transmission priorities to be assigned to proxies 320, 330, and 340, based on an order in which the packets are received.

Figure 10:
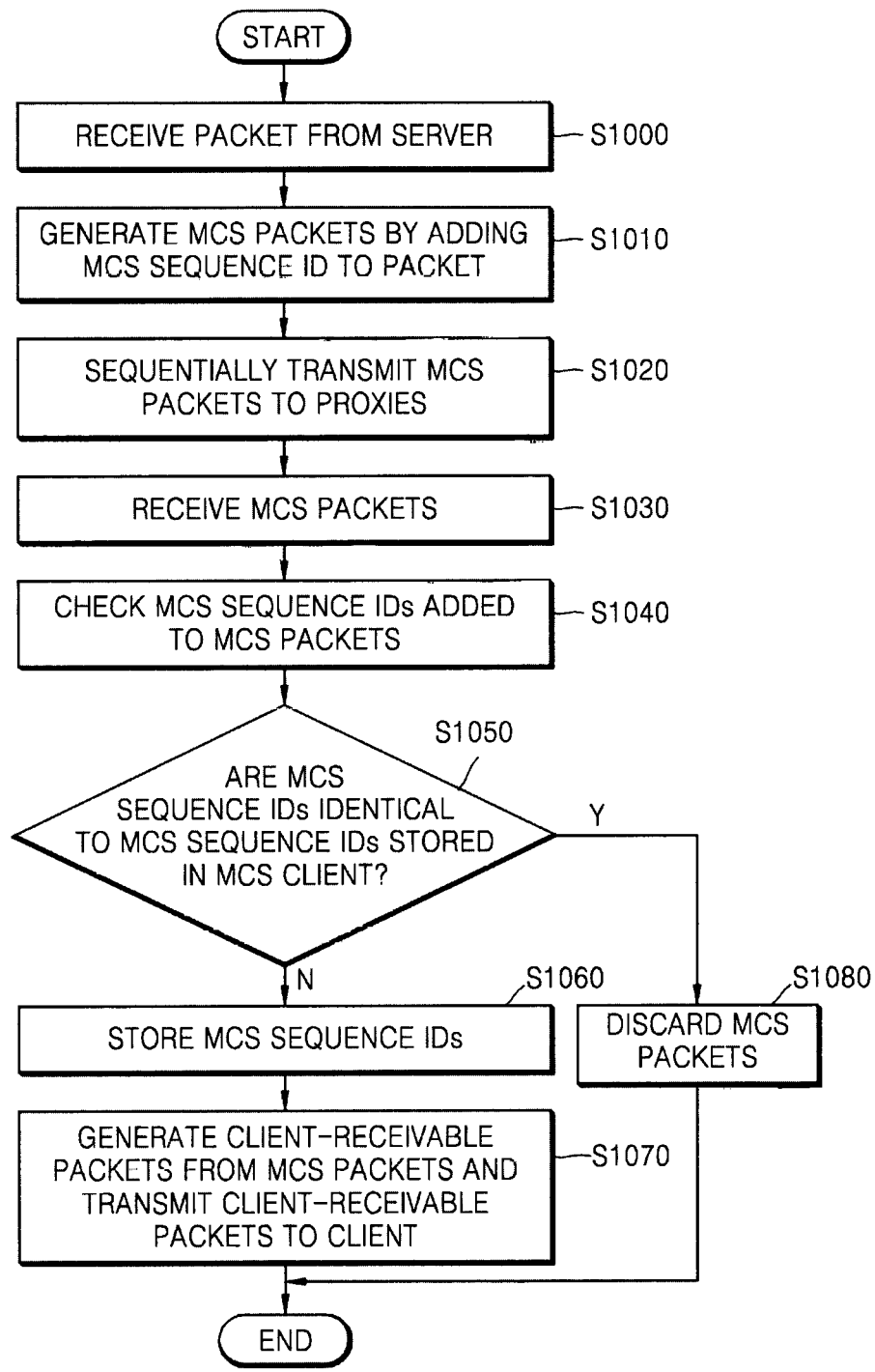
FIG. 10 is a flowchart of a multi-connection method of providing a service using an Internet protocol, according to another embodiment of the present invention.

FIG. 10 is a flowchart of a multi-connection method of providing a service using an Internet protocol, according to another embodiment of the present invention.

A multi-connection method of providing a service using an Internet protocol, according to another embodiment of the present invention, will be described with reference to FIGS. 4 and 10 below.

The MCS server 410 receives a packet from the server 460 (operation S1000).

The MCS server 410 generates MCS packets by adding an MCS sequence ID identifying the packet to the packet (operation S1010).

The MCS server 410 sequentially transmits the MCS packets to the proxies 420, 430, and 440 connected via a network (operation S1020)

When each of the proxies 420, 430, and 440 transmits the MCS packets received from the MCS server 410 to the MCS client 400 connected thereto via a network, the MCS client 400 receives the MCS packets from the respective proxies 420, 430, and 440 (operation S1030).

The MCS client 400 checks MCS sequence IDs added to the MCS packets (operation S1040).

The MCS client 400 compares the MCS sequence IDs with MCS sequence IDs stored in the MCS client 400 to determine whether they are the same (operation S1050).

When the MCS sequence IDs are not identical to the stored MCS sequence IDs, the MCS client 400 stores the MCS sequence IDs (operation S1060), generates client-receivable packets from the MCS packets, and transmits the client-receivable packets to the client 450 (operation S1070).

When the MCS sequence IDs are identical to the stored MCS sequence IDs, the MCS client 400 discards the MCS packets received from the respective proxies 420, 430, and 440 without transmitting them to the client 450 (operation S1080)

The MCS server 410 may transmit the MCS packet, to which the MCS sequence IDs are added, to the proxies 420, 430, and 440 connected via a network, according to transmission priorities that are set beforehand to be assigned to the proxies 420, 430, and 440. Here, the MCS server 410 may set the transmission priorities assigned to the the proxies 420, 430, and 440, based on an order in which packets are received from the respective proxies 420, 430, and 440.

The MCS server 410 may form sessions with the respective proxies 420, 430, and 440 to store access information and transmit the MCS packets to the respective proxies 420, 430, and 440.

The present invention will be described in more detail below.

Elements to be embodied in an MCS are included as elements of the MCS. Since the MCS is a system operating in a network, the elements of the MCS should be determined according to the characteristics of the MCS operating in the network. The MCS may operate according to TCP, SCTP, UDP, or a protocol designed therefor. However, communication logics employed in these protocols in a network are different and thus the MCS operating in the network operates differently according to the features of the protocols. However, the TCP and the SCTP have similar structures and thus operate similarly. The protocol designed for the MCS operates similar to the UDP. Thus, when the MCS operates according to the SCTP or the protocol designed for the MCS, the elements of the MCS are not additionally described herein.

The following elements of the MCS may be taken into account when an MCS client establishes communication using the TCP and the SCTP. The MCS client transmits or receives a packet to or from a client, a proxy, or an MCS server so as to communicate with the client, the proxy, or the MCS server. Thus, the following two conditions should be satisfied so that the MCS client may operate normally.

First, the client and the MCS client should be connected to each other in a network. Second, the MCS client should have access information regarding the proxy or the MCS server.

Figure 7:
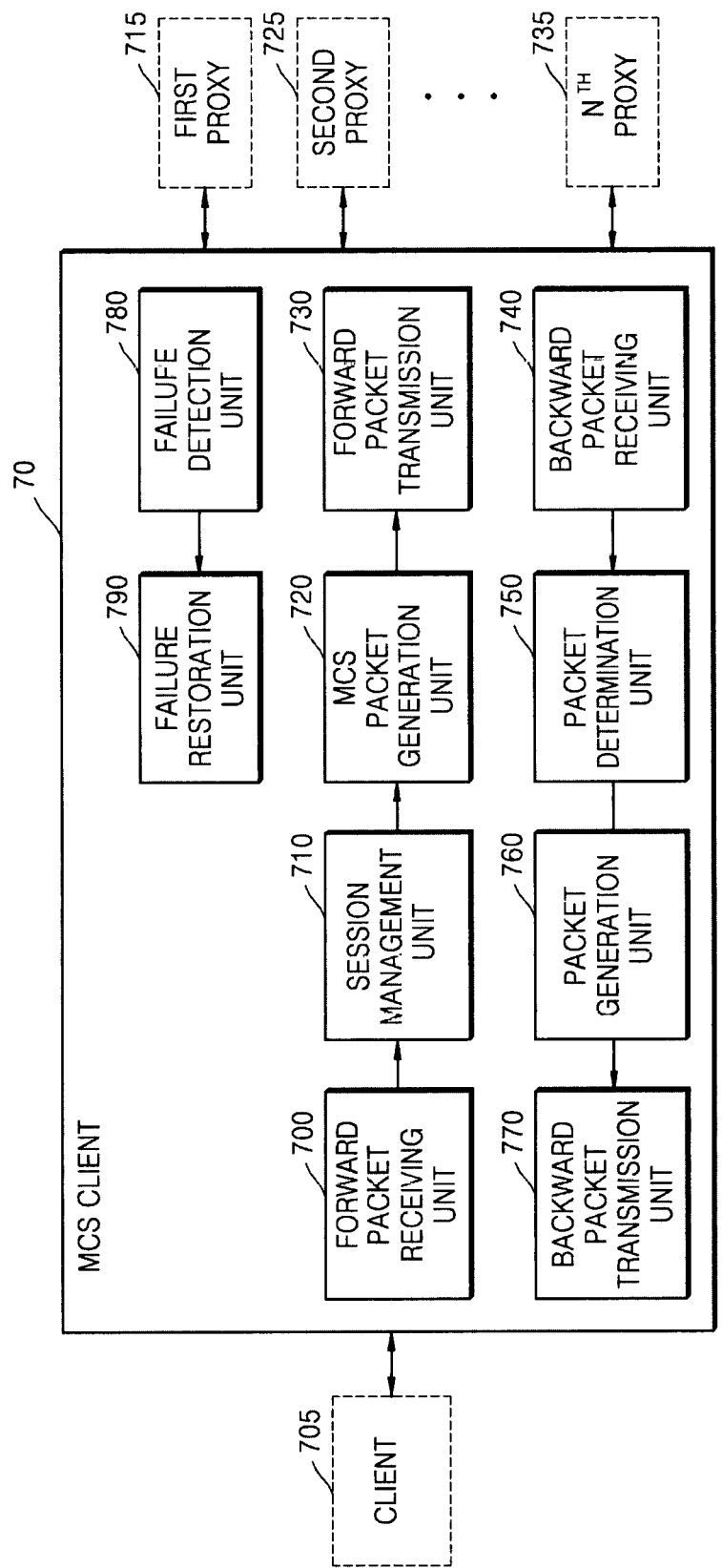
FIG. 7 is a block diagram of an MCS client 70 according to another embodiment of the present invention.

FIG. 7 is a block diagram of an MCS client 70 according to another embodiment of the present invention. A forward packet receiving unit 700 receives a packet of a client 705. The MCS client 70 receives a packet from the client 705 to transmit the packet to at least one proxy.

A session management unit 710 will now be described. The MCS client 70 is connected to at least one proxy or an MCS server. Thus, in order to efficiently transmit a packet, the MCS client 70 should obtain access information regarding at least one proxy or an MCS server to which the MCS client 70 desires to transmit a packet. In this case, the session management unit 710 may obtain a desired number of pieces of access information regarding the at least one proxy and a number of pieces of spare access information.

When the access information is obtained, the session management unit 710 sets IP information and a method of accessing the packet. The IP information and method may be set using a DNS or an MCS client application programming interface (API).

In this case, since at least one proxy may be present in the MCS, the packet should be transmitted via a highest speed line to quickly transmit the packet. The session management unit 710 may determine the operating speeds of proxies to be accessed by using a priority algorithm, and set an order in which the packet is to be transmitted to the proxies such that the packet is first transmitted to the highest-speed proxy. When priorities assigned to the proxies have been already determined, the session management unit 710 may set priorities of the packet according to the determined priorities.

Also, the session management unit 710 may connect, to the MCS client 70, only some proxies among proxies corresponding to a list of pieces of access information obtained beforehand. When a failure occurs in a proxy or an MCS server, the failure way be detected in real time, and the list of pieces of the access information obtained beforehand may be used to replace the proxy with a spare proxy corresponding to spare proxy access information included in the list.

Thus, when a failure occurs in a proxy, a communication failure may be rapidly handled.

Next, an MCS packet generation unit 720 will now be described. The MCS includes at least one proxy or the MCS server, and transmits packets, the number of which is equal to the number of pieces of access information regarding the at least one proxy or the MCS server. Thus, the MCS packet generation unit 720 should generate MCS packets in a number corresponding to the number of pieces of access information of the at least one proxy.

A forward packet transmission unit 730 transmits a generated MCS packet to a proxy connected to an MCS client.

A backward packet receiving unit 740 receives a packet of a proxy. The MCS client 70 receives a packet from at least one proxy to transmit the packet to the client 705.

In an MCS, the same packet is transmitted from at least one proxy and thus a function of processing this packet is required. A packet determination unit 750 may determine whether a redundant packet is to be used and process the redundant packet, based on specific data included in an MCS header.

The client 705 cannot directly use a packet generated by an MCS module. Thus, the packet should be converted into a packet that the client 705 may receive. To this end, a packet generation unit 760 generates a client-receivable packet from an MCS packet that has been determined by the packet determination unit 750.

A backward packet transmission unit 770 transmits a packet that is completely processed by the MCS client 70 to the client 705.

Factors that may be taken into account when the MCS server establishes communication using the TCP and the SCTP will be described below. The MCS server transmits or receives a packet to or from a server, a proxy, or an MCS client to communicate with the server, the proxy, or the MCS. Thus, the following two conditions should be satisfied so that the MCS server may operate normally.

The first condition is that a server and an MCS server should be connected in a network. The second condition is that the MCS server should have access information regarding a proxy or an MCS client.

Figure 8:
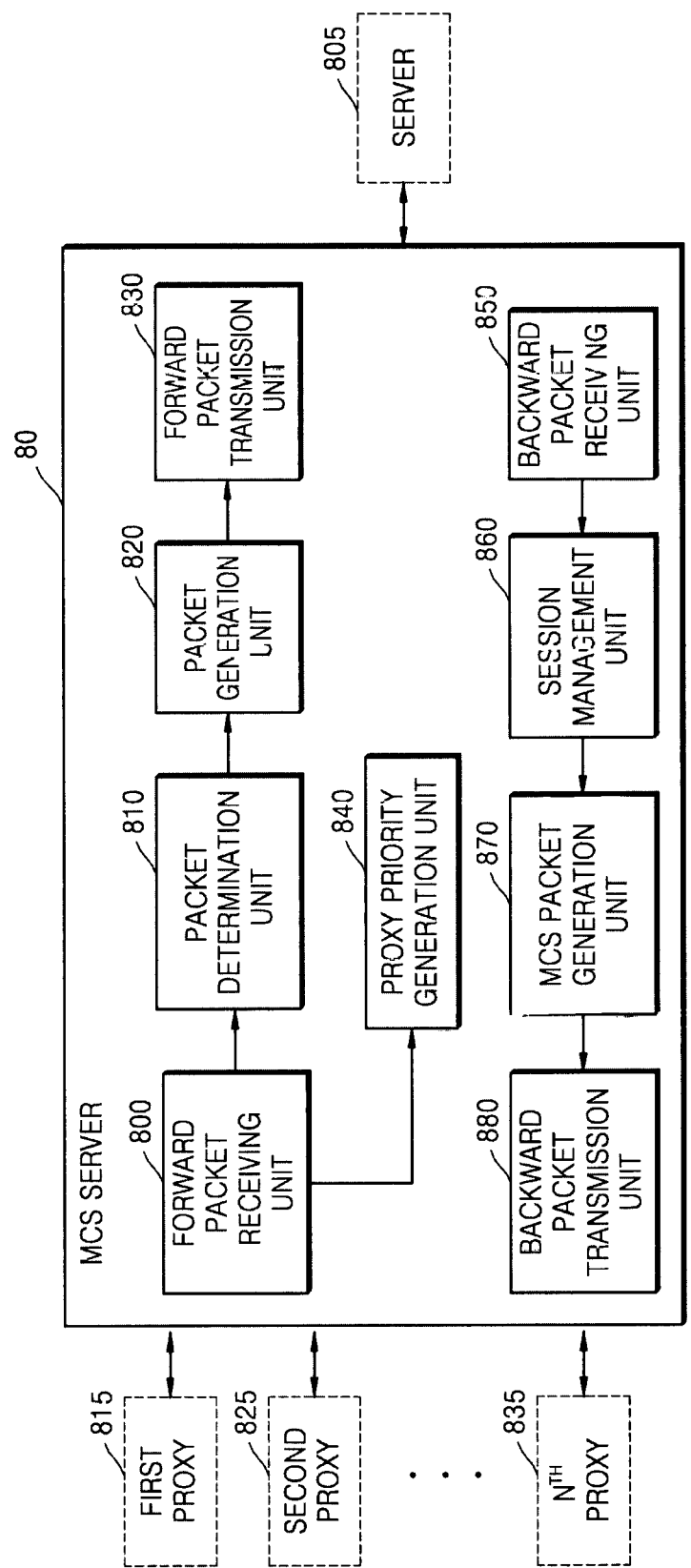
FIG. 8 is a block diagram of an MCS server 80 according to another embodiment of the present invention.

FIG. 8 is a block diagram of an MCS server 80 according to another embodiment of the present invention. A forward packet receiving unit 800 receives a packet of a proxy. The MCS server 80 receives a packet from at least one proxy to transmit the packet to a server 805.

In an MCS, the same packet is transmitted from at least one proxy and thus a function of processing this packet is required. A packet determination unit 810 may determine whether a redundant packet is to be used and process the redundant packet, based on specific data included in an MCS header.

Since the server 805 cannot directly use a packet generated by an MCS module, the packet should be converted into a packet that the server 805 may receive. To this end, a packet generation unit 820 generates a server-receivable packet from an MCS packet that has been determined by the packet determination unit 810.

A forward packet transmission unit 830 transmits a packet that is completely processed by the MCS server 80 to the server 805.

A backward packet receiving unit 850 receives a packet of the server 805. The MCS server 80 receives a packet from the server 805 to transmit the packet to at least one proxy.

A session management unit 860 sets access information representing the destination of a packet and the like, based on a packet received from an MCS client or at least one proxy. When the access information is obtained, a session management unit 860 sets IP information and a method of accessing a packet. The IP information and the method of accessing the packet may be set using an MCS server API.

Also, the session management unit 860 of the MCS server 80 may determine packet transmission priorities, based on an order in which packets are received from an MCS client or at least one proxy.

An MCS includes at least one proxy or an MCS client and is configured to transmit packets, the number of which is equal to the number of pieces of access information regarding the at least one proxy or the MCS client. Thus, an MCS packet generation unit 870 generates MCS packets in a number corresponding to the number of the pieces of access information.

A backward packet transmission unit 880 transmits the MCS packets to a proxy connected to the MCS server 80.

Factors that may be taken into account when an MCS client establishes communication using a UDP or a protocol designed therefor will be described below. The MCS client transmits or receives a packet to or from a client, a proxy, or the MCS server 80 to communicate with the client, the proxy, or the MCS server 80. Thus, the following two conditions should be satisfied so that the MCS client may operate normally. Also, when the MCS client operates according to the UDP or the protocol designed therefor, the session management unit 860 may be omitted unlike when the MCS client operates according to the TCP.

The first condition is that a client and the MCS client should be connected in a network. The second condition is that the MCS client should have access information regarding a proxy or the MCS server 80.

FIG. 5 is a block diagram of the MCS client 50 establishing communication using the UDP or a protocol designed therefor according to an embodiment of the present invention.

The forward packet receiving unit 500 receives a packet of the client 505. The MCS client 50 receives a packet from the client 505 to transmit the packet to at least one proxy.

An MCS includes at least one proxy or an MCS server and is configured to transmit packets, the number of which is equal to the number of pieces of access information regarding the at least one proxy or the MCS server. Thus, the MCS packet generation unit 510 generates transmission packets in a number corresponding to the number of the pieces of the access information.

The forward packet transmission unit 520 transmits generated MCS packets to the proxies 515, 525, and 535 connected to the MCS client.

The backward packet receiving unit 540 receives a packet of a proxy. The MCS client receives a packet from at least one proxy to transmit the packet to the client 505.

In an MCS, the same packet is transmitted from at least one proxy and thus a function of processing this packet is required. The packet determination unit 550 may determine whether a redundant packet is to be used and process the redundant packet, based on specific data included in an MCS header.

Since the client 505 cannot directly use a packet generated by an MCS module, the packet should be converted into a packet that the client 505 may receive it. To this end, the packet generation unit 560 generates a client-receivable packet from an MCS packet that has been determined by the packet determination unit 550.

The backward packet transmission unit 570 transmits a packet that is completely processed by the MCS client 50 to the client 505.

Factors that may be taken into account when the MCS server establishes communication using the UDP and a protocol designed therefor will be described below. The MCS server transmits or receives a packet from a server, a proxy, or the MCS client to communicate with packet from the server, the proxy, or the MCS client. Thus, the following two conditions should be satisfied so that the MCS server may operate normally. When the MCS server operates using the UDP and a protocol designed therefor, a session management unit configured to manage a session may be omitted unlike when the MCS server operates using the TCP.

The first condition is that a server and the MCS server should be connected in a network. The second condition is that the MCS server should have access information regarding a proxy or the MCS client 50.

FIG. 6 is a block diagram of the MCS server 60 according to an embodiment of the present invention.

The forward packet receiving unit 800 receives a packet of a proxy. The MCS server 60 receives a packet from at least one proxy to transmit the packet to the server 605.

In an MCS, the same packet is transmitted from at least one proxy and thus a function of processing this packet is required. The packet determination unit 610 may determine whether a redundant packet is to be used and process the redundant packet, based on specific data included in an MCS header.

Since the server 605 cannot directly use a packet generated by an MCS module, the packet should be converted into a packet that the server 605 may receive it. To this end, the packet generation unit 620 generates a server-receivable packet from an MCS packet that has been determined by the packet determination unit 610.

The forward packet transmission unit 630 transmits a packet that is completely processed in the MCS server 60 to the server 605.

In an MCS, a multi-connection method of connecting a client and a server using the TCP and the STCP will be described in detail below.

Figure 11:
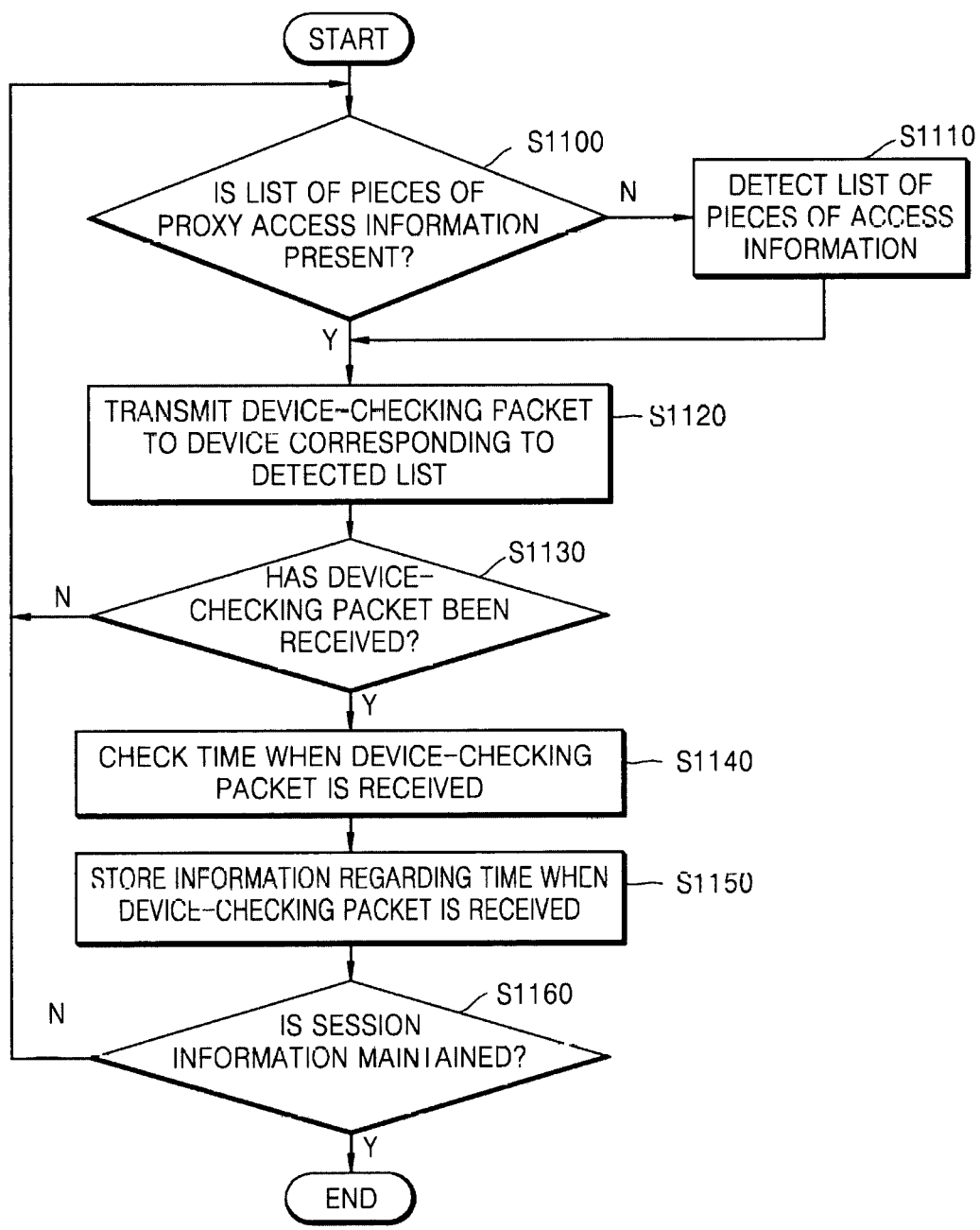
FIG. 11 is a flowchart of a method of primarily performing a session access to a device to be connected to an MCS module when an MCS is operated.

FIG. 11 is a flowchart of a method of primarily performing a session access to a device to be connected to an MCS module when an MCS is operated. Here, a device-checking packet means a packet to be transmitted to determine whether a device with which the MCS module desires communicate operates normally.

A session access will be described with reference to FIG. 11 below. First, it is checked whether a list of pieces of proxy access information is present (operation S1100). When the list of pieces of proxy access information is not present, a list of pieces of access information is detected (operation S1110). Then, the device-checking packet is transmitted to a device corresponding to the detected list (operation S1120). Then it is checked whether the device-checking packet is received (operation S1130), time when the device-checking packet is received is checked (operation S1140), and information regarding the time when the device-checking packet is received is stored (operation S1150). When it is determined that session information is maintained (operation S1160), the method is ended. When it is determined that session information is not maintained (operation S1160), operation S1100 is performed to check whether a list of pieces of proxy access information is present.

Figure 12:
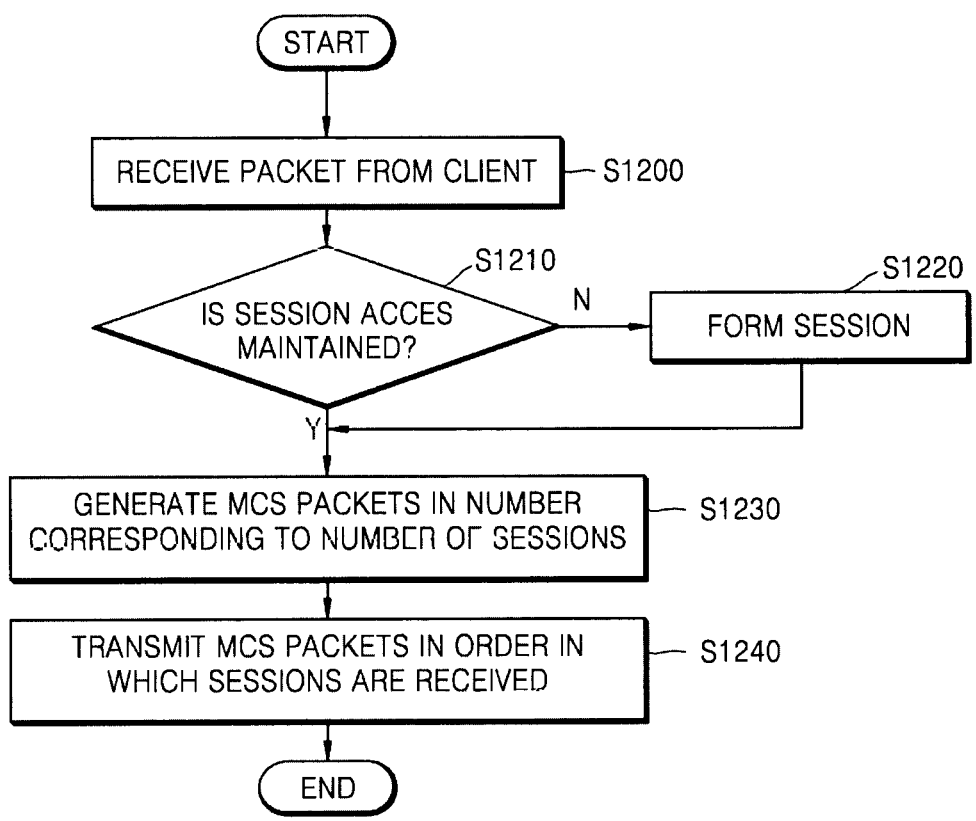
FIG. 12 is a flowchart of a forward packet transmission method of transmitting a packet received from a client to a proxy via an MCS client.

FIG. 12 is a flowchart of a forward packet transmission method of transmitting a packet received from a client to a proxy via an MCS client.

A forward packet transmission method of transmitting a packet from a client to a proxy will be described with reference to FIG. 12 below. First, an MCS client receives a packet from a client (operation S1200). Then it is checked whether a session access to a proxy is maintained (operation S1210). When the session access is not maintained, the MCS client forms sessions (operation S1220). Then, MCS packets are generated in a number corresponding to the number of the sessions (operation S1230). Thereafter, the MCS packets are transmitted in an order in which the sessions are received (operation S1240).

Figure 13:
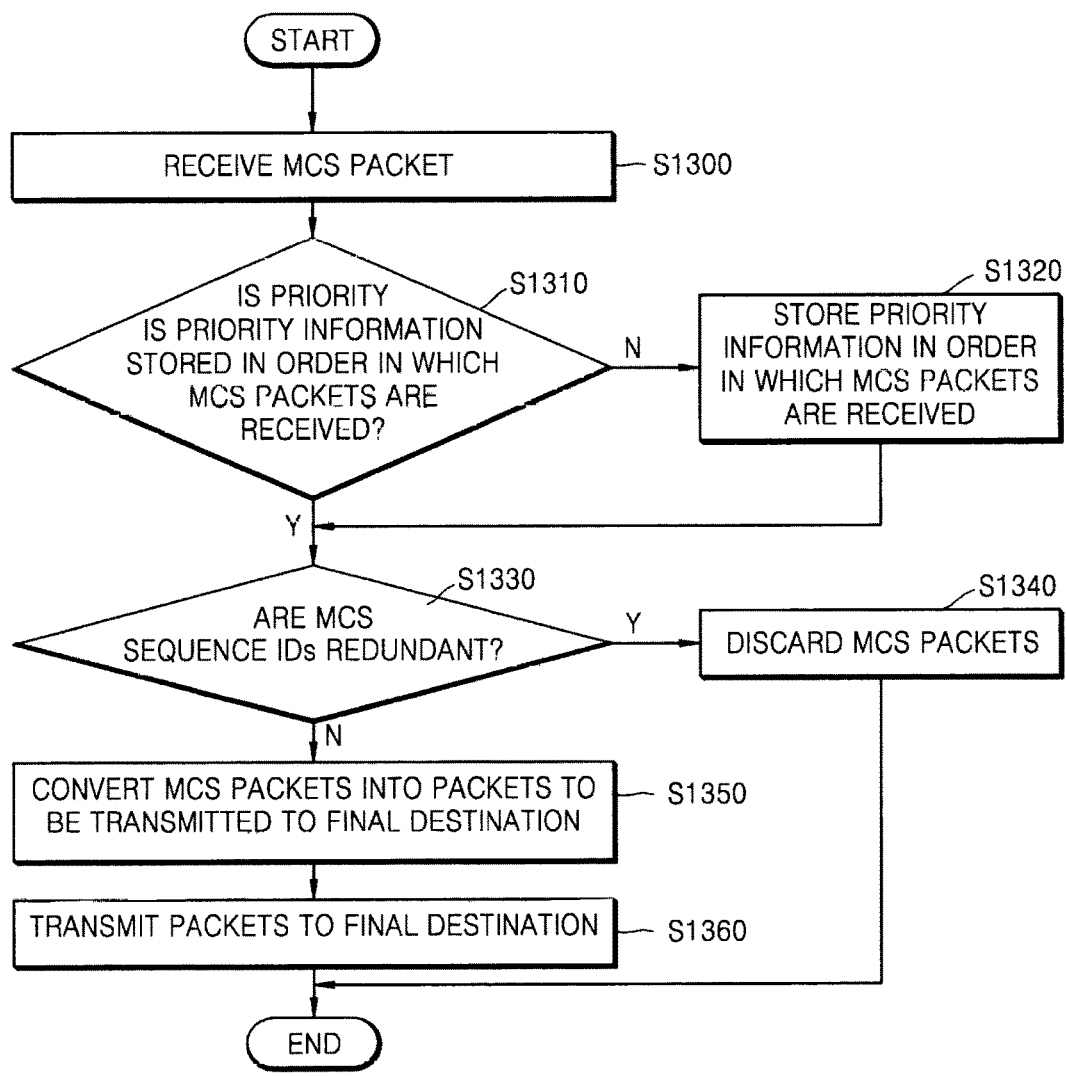
FIG. 13 is a flowchart of a forward packet transmission method of transmitting a packet received from a proxy to a server via an MCS server.

FIG. 13 is a flowchart of a forward packet transmission method of transmitting a packet received from a proxy to a server via an MCS server.

The forward packet transmission method of transmitting a packet from a proxy to a server will be described with reference to FIG. 13 below. First, an MCS server receives an MCS packet (operation S1300). It is checked whether priority information is stored in an order in which the MCS packets are received (operation S1310). When the priority information is not stored in the order in which MCS packets are received, the priority information is stored in the order in which the MCS packets are received (operation S1320).

Then, it is determined whether MCS sequence IDs are redundant, i.e., it is determined whether MCS sequence IDs included in the MCS packets are identical to MCS sequence IDs stored beforehand (operation S1330). When the MCS sequence IDs are identical to the stored MCS sequence IDs, the MCS packets are discarded (operation S1340). When the MCS sequence IDs are not identical to the stored MCS sequence IDs, the MCS packets are converted into packets to be transmitted to a final destination (operation S1350). The packets are transmitted to the final destination (operation S1360).

Figure 14:
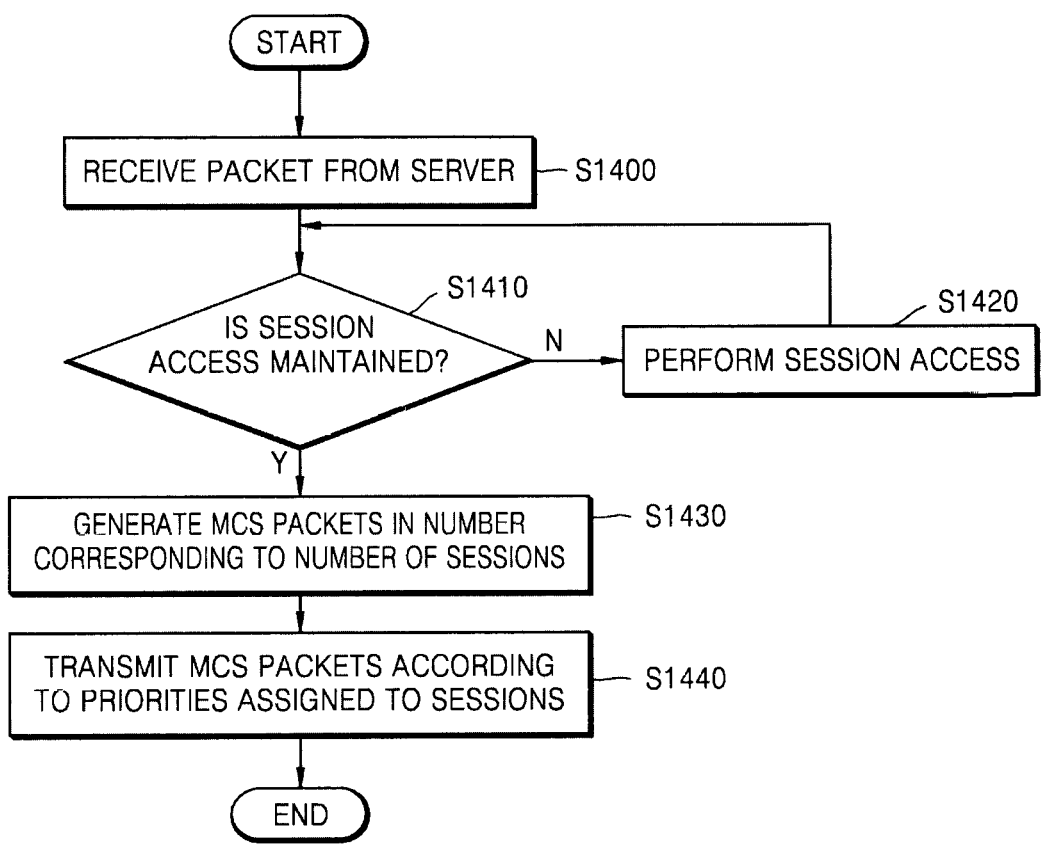
FIG. 14 is a flowchart of a backward packet transmission method of transmitting a packet received from a server to a proxy via an MCS client.

FIG. 14 is a flowchart of a backward packet transmission method of transmitting a packet received from a server to a proxy via an MCS client.

The backward packet transmission method of transmitting a packet from a server to a proxy will be described with reference to FIG. 14 below. First, an MCS server receives a packet from a server (operation S1400), and it is checked whether a session access is maintained (operation S1410). When a session access is not maintained, a session access is performed (operation S1420). Then, MCS packets are generated in a number corresponding to the number of sessions (operation S1430). The MCS packets are transmitted according to priorities assigned to the sessions (operation S1440).

Figure 15:
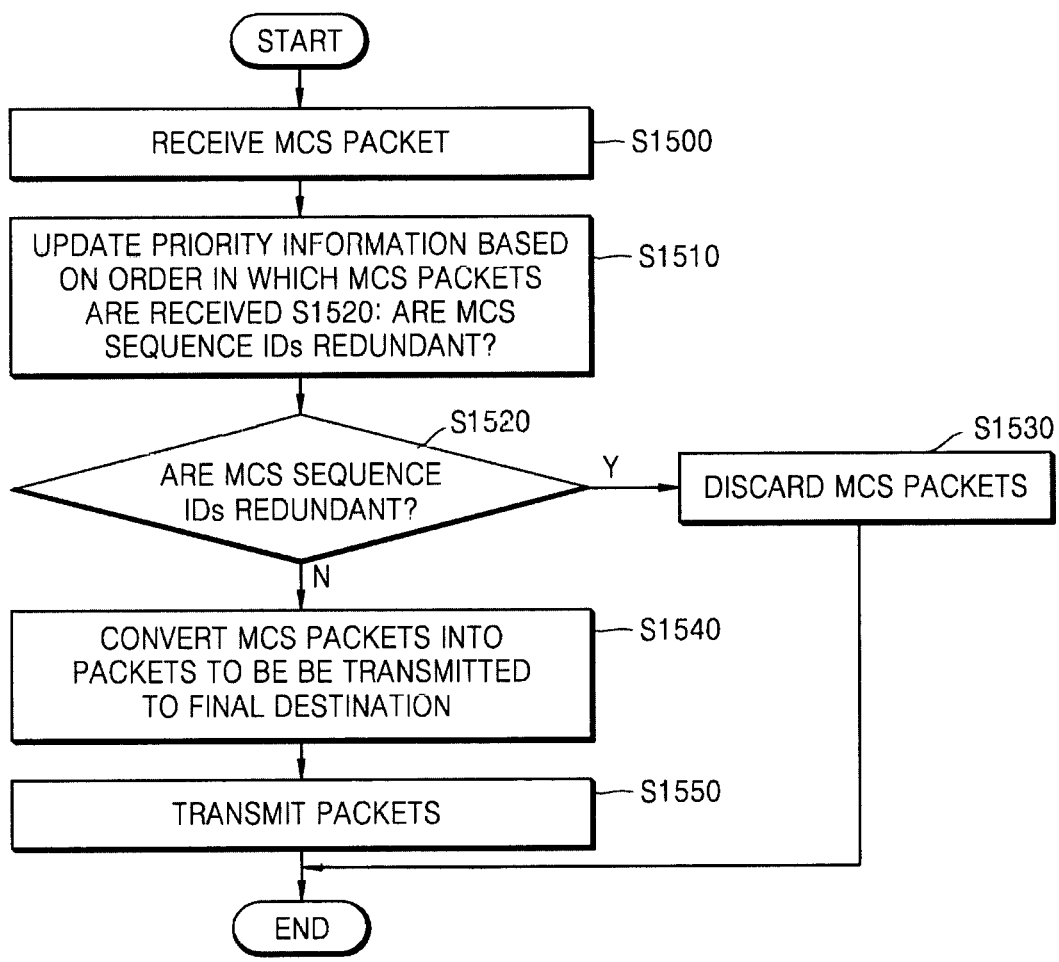
FIG. 15 is a flowchart of a backward packet transmission method of transmitting a packet received from a proxy to a client via an MCS server.

FIG. 15 is a flowchart of a backward packet transmission method of transmitting a packet received from a proxy to a client via an MCS server.

The backward packet transmission method of transmitting a packet from a proxy to a client will be described with reference to FIG. 15 below. First, an MCS client receives MCS packets from a plurality of proxies (operation S1500), and priority information is updated based on an order in which the MCS packets are received (operation S1510). Then, it is determined whether MCS sequence IDs are redundant, i.e., whether MCS sequence IDs included in the MCS packets are identical to MCS sequence IDs stored beforehand (operation S1520). When the MCS sequence IDs are identical to the stored MCS sequence IDs, the MCS packets are discarded (operation S1530). When the MCS sequence IDs are not identical to the stored MCS sequence IDs, the MCS packets are converted into packets to be transmitted to a final destination (operation S1540). Then, the packets are transmitted to the final destination (operation S1550).

A multi-connection method performed using an MCS UDP and a protocol designed therefor will be described below.

Figure 16:
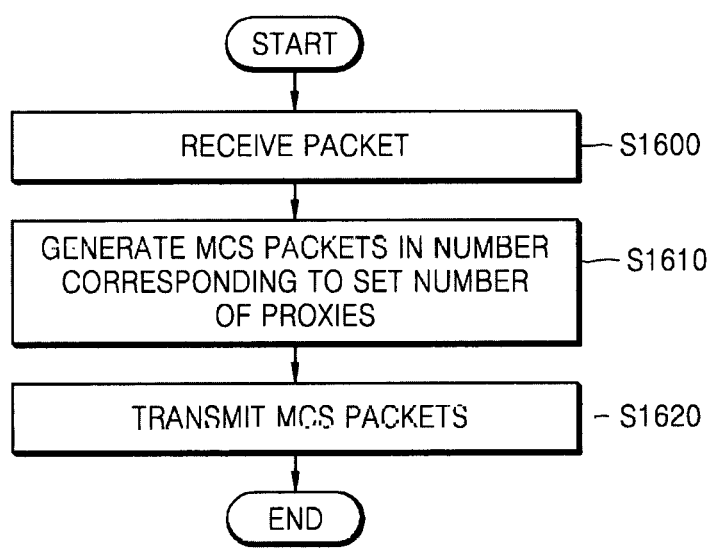
FIG. 16 is a flowchart of a forward packet transmission method of transmitting a packet received from a client to a proxy via an MCS client.

FIG. 16 is a flowchart of a forward packet transmission method of transmitting a packet received from a client to a proxy via an MCS client.

Referring to FIG. 16, first, an MCS client receives a packet (operation S1600). Then, MCS packets are generated in a number corresponding to the set number of proxies (operation S1610). Then, the MCS packets are transmitted to a proxy (operation S1620).

Figure 17:
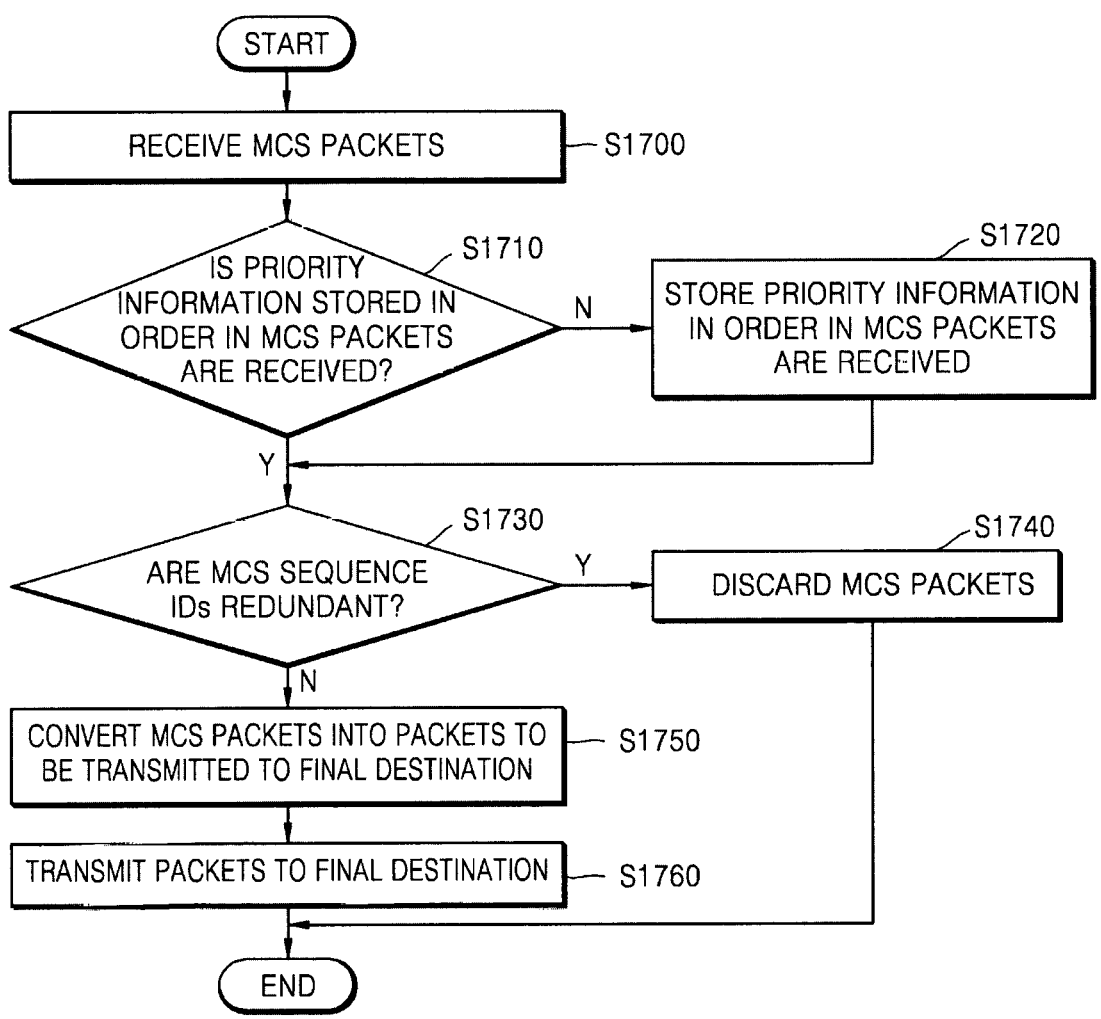
FIG. 17 is a flowchart of a forward packet transmission method of transmitting a packet received from a proxy to a server via an MCS client.

FIG. 17 is a flowchart of a forward packet transmission method of transmitting a packet received from a proxy to a server via an MCS client.

The forward packet transmission method of transmitting a packet from a proxy to a server will be described with reference to FIG. 17 below. First, an MCS server receives MCS packets from a plurality of proxies (operation S1700). Then, it is checked whether priority information is stored in an order in which the MCS packets are received (operation S1710). When the priority information is not stored in the order in which the MCS packets are received, the priority information is stored in the order in which the MCS packets are received (operation S1720).

Then, it is checked whether MCS sequence IDs are redundant (operation S1730). When the MCS sequence IDs are redundant, the MCS packets are discarded (operation S1740). When the MCS sequence IDs are not redundant, the MCS packets are converted into packets to be transmitted to a final destination and the packets are transmitted to the final destination (operation S1760).

Figure 18:
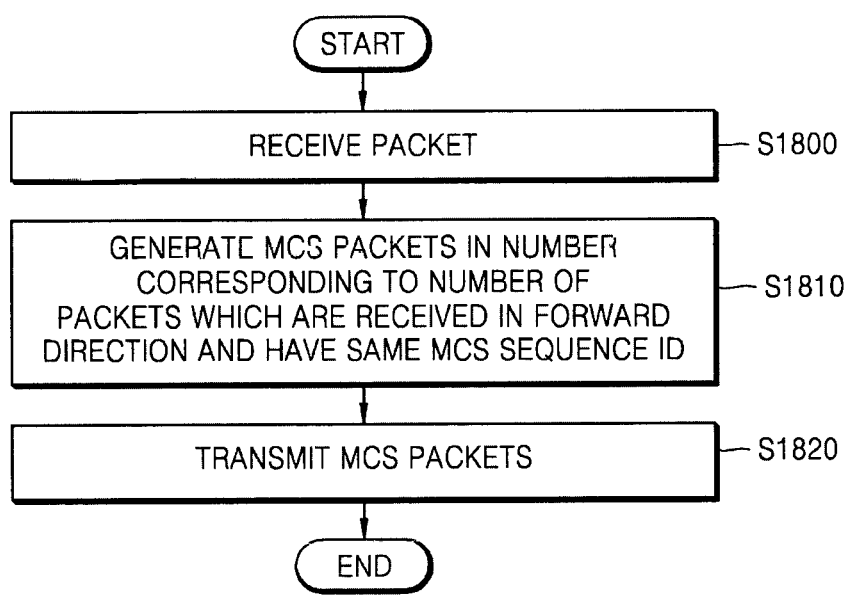
FIG. 18 is a flowchart of a backward packet transmission method of transmitting a packet received from a server to a proxy via an MCS client.

FIG. 18 is a flowchart of a backward packet transmission method of transmitting a packet received from a server to a proxy via an MCS client.

The backward packet transmission method of transmitting a packet from a server to a proxy will be described with reference to FIG. 18 below. First, an MCS server receives a packet from a server (operation S1800), and generates MCS packets in a number corresponding to the number of packets which are received in a forward direction and have the same MCS sequence ID (operation S1810). Then, the MCS server transmits the MCS packets to a plurality of proxies according to order of packets received in forward direction, the packets having the same MCS sequence ID (operation S1820).

Figure 19:
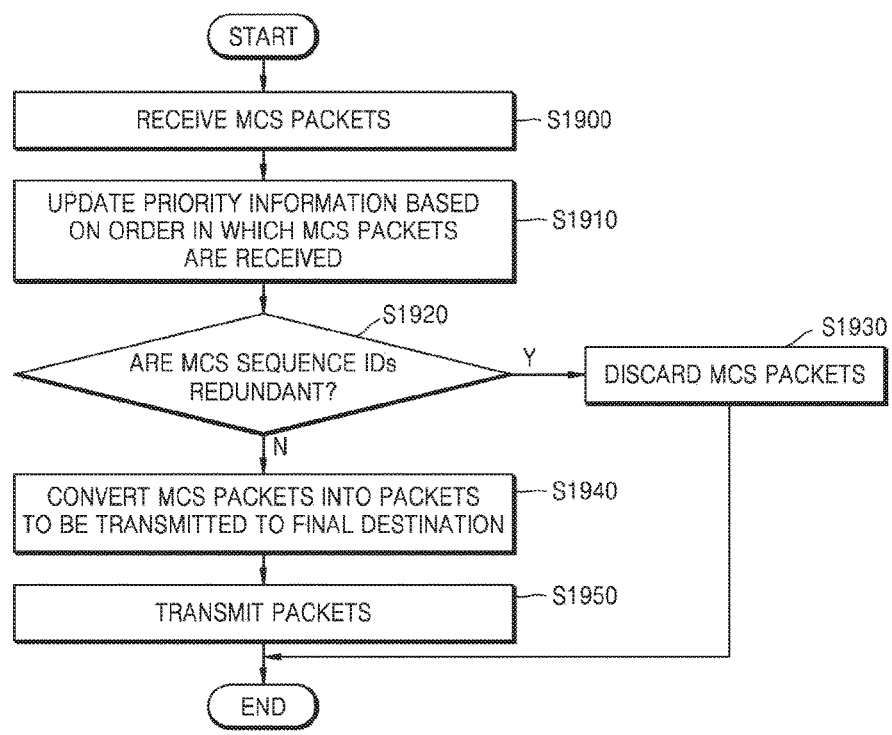
FIG. 19 is a flowchart of a backward packet transmission method of transmitting a packet received from a proxy to a client via an MCS client.

FIG. 19 is a flowchart of a backward packet transmission method of transmitting a packet received from a proxy to a client via an MCS client.

The backward packet transmission method of transmitting a packet from a proxy to a client will be described with reference to FIG. 19 below.

First, an MCS client receives MCS packets from a plurality of proxies (operation S1900). The MCS client updates priority information based on an order in which the MCS packets are received (operation S1910). Then it is checked whether MCS sequence IDs are redundant (operation S1920). When the MCS sequence IDs are redundant, the MCS packets are discarded (operation S1930). When the MCS sequence IDs are not redundant, the MCS packets are converted into packets to be transmitted to a final destination (operation S1940). Then, the packets are transmitted to a client (operation S1950).

Figure 20:
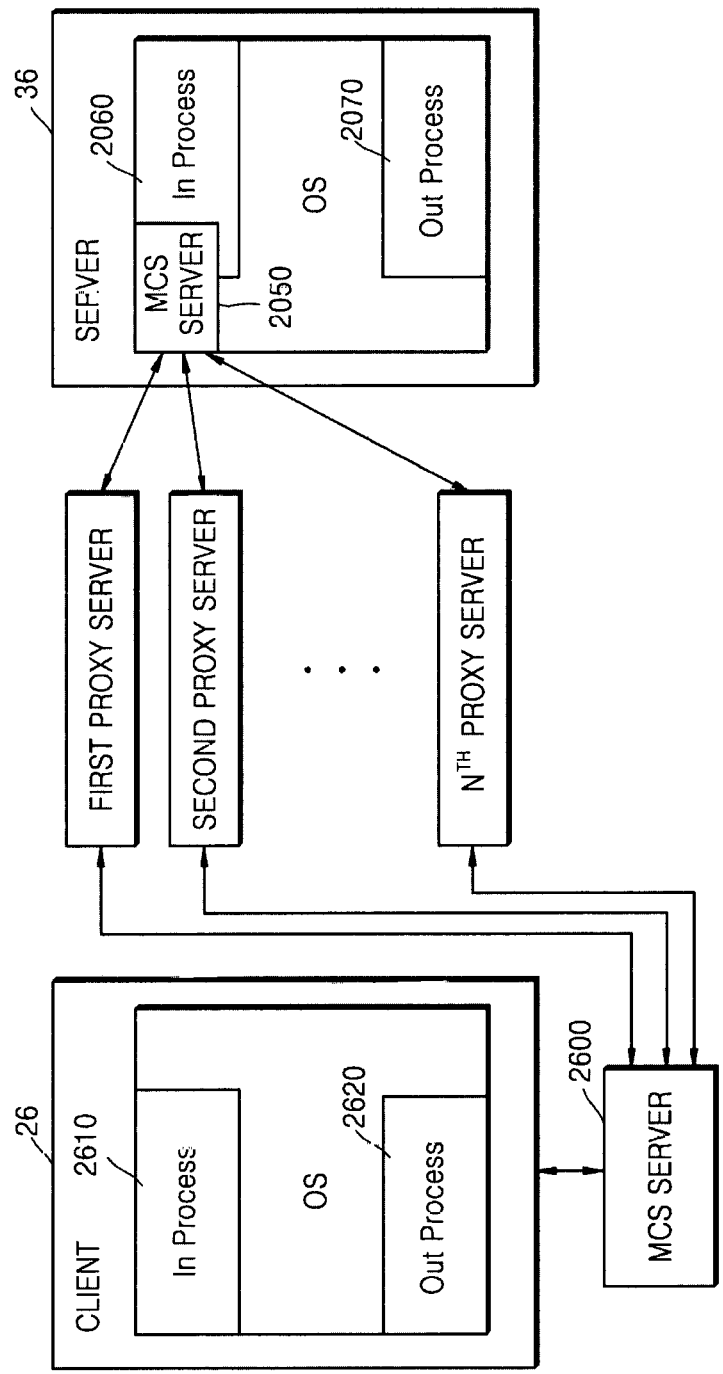
FIG. 20 illustrates a structure in which an MCS client is located outside a client and an MCS server is included in an in-process of a server operating system (OS).

An MCS according to an embodiment of the present invention will now be described. FIG. 20 illustrates a Structure in which an MCS client is located outside a client and an MCS server is included in an in-process of a server OS. The MCS client and the MCS server are connected to at least one proxy and a device configured to check the state of the at least one proxy.

As illustrated in FIG. 20, the MCS client may be operated outside a device. Here, a concept that "the MCS client is located outside the client" means that the MCS client is installed outside the client other than inside the client, i.e., the MCS client is installed at a location where the MCS client establishes communication using a line.

Thus, the MCS client may be installed outside the client. In this case, the MCS client is a physical device installed outside the client.

Also, when the MCS server is operated in the in-process of the OS, the MCS server may be operated according to a library concept. In the case of a window, when the MCS server is driven in the in-process, the MCS server is driven in the form of a dll file.

The installed MCS client and MCS server exchange information with an OS of a device, and packets are processed by a transmission unit and a receiving unit of each of the MCS client and the MCS server.

An MCS is configured to obtain a desired effect by connecting a plurality of devices. In the present disclosure, the MCS's capabilities of not only continuously providing a service but also providing security and user convenience have been described. An ultimate goal of the MCS is to seamlessly provide a service. When a network is down or under a DDoS attack, a session maintenance system should defend this attack and maintain a session therefor. A system configured only for a defense purposes has a structure that cannot handle a network disconnection or failure. However, the MCS is a system capable of controlling a packet using its own module and is thus configured to transmit the same packet to at least one line.

When a failure occurs in a line due to not only an attack but also a physical failure or a natural disaster in a system including an MCS, a packet may be transmitted to another line due to plurally transmitting the same packet. Thus, the system is capable of defending such an attack, failure, or disaster, maintaining a session, and seamlessly providing a service.

The session maintenance system forms a plurality of sessions by connecting a plurality of proxies and a plurality of source service servers under a DDoS attack. Thus, the system has a structure that needs a plurality of proxies and a plurality of source service servers. In contrast, an MCS forms a multi-connection system using its own module.

Since an MCS is a system capable of controlling a packet using its own module, the MCS may be realized without using a plurality of proxies and a plurality of source service servers. Furthermore, even if the number of lines is increased or decreased, the MCS is capable of transmitting a packet according to the lines and is thus less dependent on the lines and is useful.

Also, the session maintenance system has a disadvantage of having a structure in which a client and a server should be individually set. In contrast, an MCS has its own module that may be configured in various forms (e.g., equipment, a program, a tool, a library, etc.) as necessary. Thus, a client and a server may form an MCS by installing or mounting the MCS module at a desired location. Thus, in the MCS, the client or the server may be accessed using one infrastructure without directly changing a program to add a desired function.

In the above embodiments, an MCS is designed to maintain permanent use of a service. Under a DDoS attack, a session maintenance system is designed to defend the DDoS attack and maintain a session. However, such a system having only specific purposes is difficult to handle other failures.

However, the MCS is a system configured to control a packet using its own module and is thus configured to transmit the same packet to at least one line. Thus, even if in a system including an MCS, a failure occurs in a line due to not only an attack but also a physical failure or a natural disaster, a packet may be transmitted to another line. Thus, the system is capable of defending such an attack, failure, or disaster, maintaining a session, and providing a permanent service.

The MCS is realized using a module. The MCS may be realized using its own module. Under a DDoS attack, the session maintenance system forms a plurality of sessions by connecting a plurality of proxy servers and a plurality of origin servers. Thus, a plurality of proxy servers and a plurality of origin servers are required.

However, an MCS is a system capable of controlling a packet using its own module and may be thus realized without using a plurality of proxies and a plurality of origin servers. Furthermore, even if the number of lines is increased or decreased, the MCS is capable of transmitting a packet according to the lines and is thus less dependent on the lines.

Convenient use of the MCS may be provided to a server and a client. Under a DDoS attack, the session maintenance system has a structure in which a client and a server may be individually set. In contrast, an MCS has its own module that may be configured in various forms (e.g., equipment, a program, a tool, a library, etc.) as necessary. Thus, a client and a server may form an MCS by installing or mounting the MCS module at a desired location. Thus, in the MCS, the client or the server may be accessed using one infrastructure without directly changing a program to add a desired function.

The present invention can be embodied as code that is readable by a computer (including all devices having an information processing function) in a computer-readable recording medium. Here, the computer-readable recording medium may be any recording apparatus capable of storing data that is read by a computer system, e.g., read-only memory (ROM), random access memory (RAM), a compact disc (CD)-ROM, a magnetic tape, a floppy disk, an optical data storage device, and so on.

Although the present invention has been particularly shown and described with reference to the exemplary embodiments illustrated in the drawings, it would be obvious to those of ordinary skill in the art that the above exemplary embodiments are to cover all modifications, equivalents, and alternatives falling within the scope of the invention. Accordingly, it will be understood that various changes in form and details may be made therein without departing from the spirit and scope of the following claims.

Accordingly, an MCS according to the present invention may be effectively used to guarantee permanent use of a service which is a very important factor in a network market that has been continuously developed and increased in size.

The invention claimed is:

1. A multi-connection system (MCS) configured to connect a client and a server in a multi-connection manner for a service using an Internet protocol, the MCS comprising:
 a plurality of proxies;
 an MCS client, configured such that when the client transmits forward packets to the server, the MCS client is configured to:
  receive the forward packets from the client including a forward packet;
  assign forward packet transmission priorities by assigning a forward packet transmission priority to each of the plurality of proxies, and
  generate a forward MCS packet by adding a forward MCS sequence identification (ID) to the forward packet;
  generate a plurality of forward MCS packets by reproducing the forward MCS packet by adding forward MCS sequence IDs to forward packets;
  sequentially and respectively transmit the plurality of forward MCS packets to the plurality of proxies according to the forward packet transmission priorities,
  wherein each forward packet transmission priority is set based on a time when the MCS client transmits a device-checking packet to each of the plurality of proxies and receives a response from each of the plurality of proxies, and
  a number of the plurality of forward MCS packets corresponds to:
   a number of the plurality of proxies; or
   a set number of pieces of proxy access information; and
   the forward MCS sequence IDs added to the plurality of forward MCS packets are identical to each other; and
 an MCS server device comprising a processor and memory configured to:
  respectively receive the forward MCS packet from one of the plurality of proxies;
  extract the forward MCS sequence ID from the forward MCS packet;
  store the forward MCS sequence ID in the MCS server device in response to determining that a same forward MCS sequence ID as the forward MCS sequence ID is not stored;
  generate a server-receivable packet from the forward MCS packet;
  transmit the server-receivable packet to the server;
  discard the forward MCS packet in response to determining that a same forward MCS sequence ID as the forward MCS sequence ID is stored in the MCS server device;
  receive backward packets from the server including a backward packet, the backward packet sent from the server to the client;
  generate a backward MCS packet by adding a backward MCS sequence identification (ID) to the backward packet;
  generate a plurality of backward MCS packets by reproducing the backward MCS packet by adding backward MCS sequence IDs to the backward Packets; and
  sequentially and respectively transmit the plurality of backward MCS packets to the plurality of proxies;
  wherein:
   a number of the plurality of backward MCS packets corresponds to:
    a number of the plurality of proxies; or
    a set number of pieces of proxy access information; and
    the backward MCS sequence IDs added to the plurality of backward MCS packets are identical to each other;
 wherein the MCS client is further configured to:
  respectively receive the backward MCS packet from one of the plurality of proxies;
  detect and replace one of the plurality of proxies that failed with a new proxy corresponding to the proxy access information;
  extract the backward MCS sequence ID from the backward MCS packet;
  store the backward MCS sequence ID in the MCS client in response to determining that a same backward MCS sequence ID as the backward MCS sequence ID is not stored in the MCS client;
  generate a client-receivable packet from the backward MCS packet;
  transmit the client-receivable packet to the client; and
  discard the backward MCS packet in response to determining that the same backward MCS sequence ID as the backward MCS sequence ID is stored in the MCS client.

2. The MCS of claim 1, wherein the MCS client is further configured to:

transmit a query requesting proxy access information to a domain name server (DNS) which uses or provides pieces of proxy access information;
receive the pieces of proxy access information from the DNS; and
use the pieces of proxy access information as the set number of pieces of proxy access information.

3. The MCS of claim 1, wherein the MCS client is further configured to:
store the set number of pieces of proxy access information in the MCS client by forming sessions with the plurality of proxies, and
generate the plurality of forward MCS packets corresponding to the set number of pieces of proxy access information by reproducing the forward MCS packet.

4. The MCS of claim 1, wherein, the MCS server device is further configured to:
assign backward packet transmission priorities by assigning a backward packet transmission priority to each of the plurality of proxies; and
sequentially and respectively transmit the plurality of backward MCS packets to the plurality of proxies according to each of the backward packet transmission priorities;
wherein each backward packet transmission priority is set based on an order in which individual packets of the plurality of forward MCS packets are received by the MCS server device from each of the plurality of proxies.

5. The MCS of claim 1, wherein the MCS client comprises a software program installed in the client or a software program installed in a device separate from the client.

6. The MCS of claim 1, wherein the MCS client comprises an MCS client device.

7. A method for a service using an Internet protocol using a multi-connection system (MCS) configured to connect a client and a server in a multi-connection manner, the method comprising:
receiving forward packets including a forward packet at a MCS client from the client;
generating with the MCS client, a forward MCS packet by adding a forward MCS sequence identification (ID) to the forward packet;
generating, with the MCS client, a plurality of forward MCS packets by reproducing the forward MCS packet by adding forward MCS sequence IDs to the forward packets, wherein a number of the plurality of forward MCS packets corresponds to a number of a plurality of proxies connected to the MCS or a set number of pieces of proxy access information, and the forward MCS sequence IDs added to the plurality of forward MCS packets are identical to each other;
assigning forward packet transmission priorities by assigning a forward packet transmission priority to each of the plurality of proxies with the MCS client, and
sequentially and respectively transmitting individual packets of the plurality of forward MCS packets, with the MCS client, to each of the plurality of proxies according to each of the forward packet transmission priorities, wherein each forward packet transmission priority is set based on a time when the MCS client transmits a device-checking packet to each of the plurality of proxies and receives a response from each of the plurality of proxies;
transmitting, with individual proxies of the plurality of proxies, each forward MCS packet of the plurality of forward MCS packets received from the MCS client to an MCS server device connected to the plurality of proxies;
receiving the forward MCS packet at the MCS server device from an individual proxy of the plurality of proxies;
extracting the forward MCS sequence ID included in the forward MCS packet with the MCS server device;
storing the forward MCS sequence ID with the MCS server device in response to determining that the same forward MCS sequence ID as the forward MCS sequence ID is not stored in the MCS server device;
generating a server-receivable packet from the forward MCS packet with the MCS server device;
transmitting the server-receivable packet with the MCS server device to the server;
discarding, with the MCS server device, the forward MCS packet received from the individual proxy of the plurality of proxies in response to determining that the same forward MCS sequence ID as the forward MCS sequence ID is stored in the MCS server device;
receiving backward packets including a backward packet at the MCS server device from the server;
generating, with the MCS server device, a backward MCS packet by adding a backward MCS sequence ID to the backward packet;
generating, with the MCS server device, a plurality of backward MCS packets by reproducing the backward MCS packet by adding backward MCS sequence IDs to the backward packets, wherein a number of the plurality of backward MCS packets corresponds to the number of the plurality of proxies or the set number of pieces of proxy access information, and the backward MCS sequence IDs added to the plurality of backward MCS packets are identical to each other; and
sequentially and respectively transmitting, with the MCS server device, the plurality of backward MCS packets to the plurality of proxies;
transmitting, with individual proxies of the plurality of proxies, the backward MCS packet received from the MCS server device to the MCS client;
extracting the backward MCS sequence ID included in the backward MCS packet received from one of the plurality of proxies with the MCS client;
storing the backward MCS sequence ID in response to determining that a same backward MCS sequence ID as the backward MCs sequence ID is not stored in the MCS client;
generating a client-receivable packet from the backward MCS packet with the MCs client;
transmitting the client-receivable packet to the client with the MCS client; and
discarding the backward MCS packet received from the one of the plurality of proxies with the MCS client in response to determining that a same backward MCS sequence ID as the backward MCS sequence ID is stored in the MCS client,
wherein when one of the plurality of proxies fails, the MCS client detects and replaces the one of the plurality of proxies that failed with a new proxy corresponding to the proxy access information.

8. The method of claim 7, further comprising storing the set number of pieces of proxy access information in the MCS client by forming sessions with the plurality of proxies with the MCS client, and wherein the generating the plurality of forward MCS packets comprises generating a plurality of forward MCS packets corresponding to the set number of pieces of proxy access information by reproducing the forward MCS packet.

9. The method of claim 7, further comprising:
assigning backward packet transmission priorities by assigning a backward packet transmission priority to each of the plurality of proxies with the MCS server device; and
wherein the sequentially and respectively transmitting of individual packets of the plurality of backward MCS packets to each of the plurality of proxies occurs according to each of the backward packet transmission priorities;
wherein each backward packet transmission priority is set based on an order in which the plurality of forward MCS packets are received at the MCS server device from each of the plurality of proxies.

10. The method of claim 7, further comprising
transmitting a query with the MCS client requesting proxy access information to a domain name server (DNS) which uses or provides pieces of proxy access information,
receiving the pieces of proxy access information from the DNS, and
using the pieces of proxy access information as the set number of pieces of proxy access information.

11. The method of claim 7, wherein the MCS client comprises a software program installed in the client or a software program installed in a device separate from the client.

12. The method of claim 7, wherein the MCS client comprises an MCS client device.

* * * * *